(12) United States Patent
Kranski et al.

(10) Patent No.: US 10,547,833 B2
(45) Date of Patent: Jan. 28, 2020

(54) CAMERA CALIBRATION SYSTEM, TARGET, AND PROCESS

(71) Applicant: Magic Leap, Inc., Plantation, FL (US)

(72) Inventors: Jeffrey Steven Kranski, San Jose, CA (US); Frederick Dennis Zyda, Redwood City, CA (US); Grace Vesom, Sonoma, CA (US); Grace Shin-Yee Tsai, Sunnyvale, CA (US); Jeremy A. Grata, Coral Springs, FL (US); Zhiheng Jia, Plantation, FL (US); Li Jiang, Sunnyvale, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/635,120

(22) Filed: Jun. 27, 2017

(65) Prior Publication Data

US 2017/0374360 A1    Dec. 28, 2017

Related U.S. Application Data

(60) Provisional application No. 62/355,805, filed on Jun. 28, 2016.

(51) Int. Cl.
| | | |
|---|---|---|
| *H04N 17/00* | (2006.01) | |
| *H04N 5/247* | (2006.01) | |
| *G06T 7/80* | (2017.01) | |
| *B65G 15/28* | (2006.01) | |

(52) U.S. Cl.
CPC .............. *H04N 17/002* (2013.01); *G06T 7/80* (2017.01); *H04N 5/247* (2013.01); *B65G 15/28* (2013.01)

(58) Field of Classification Search
None
See application file for complete search history.

(56) References Cited

U.S. PATENT DOCUMENTS

| | | | |
|---|---|---|---|
| 6,009,359 A | 12/1999 | El-Hakim et al. | |
| 9,001,226 B1 | 4/2015 | Ng et al. | |
| 2004/0160512 A1 | 8/2004 | Lee et al. | |
| 2006/0125921 A1 | 6/2006 | Foote | |
| 2008/0259179 A1 | 10/2008 | Senior et al. | |
| 2010/0098327 A1 | 4/2010 | Se et al. | |
| 2011/0222757 A1* | 9/2011 | Yeatman, Jr. | ........ H04N 13/239 382/154 |
| 2015/0294483 A1 | 10/2015 | Wells et al. | |
| 2016/0182903 A1* | 6/2016 | Grundhofer | .............. G06T 7/80 348/187 |
| 2016/0373734 A1* | 12/2016 | Cole | ..................... H04N 13/232 |

FOREIGN PATENT DOCUMENTS

WO    WO 2015/134958    9/2015

OTHER PUBLICATIONS

PCT International Search Report and Written Opinion for International Appln. No. PCT/US2017/039600, Applicant Magic Leap, Inc., Forms PCT/ISA/210, 220, and 237, dated Sep. 8, 2017 (9 pages).

\* cited by examiner

*Primary Examiner* — Samira Monshi
(74) *Attorney, Agent, or Firm* — Vista IP Law Group LLP

(57) ABSTRACT

An improved method, system, and apparatus is provided to perform camera calibration, where cameras are mounted onto a moving conveyance apparatus to capture images of a multi-planar calibration target. The calibration process is optimized by reducing the number of images captured while simultaneously preserving overall information density.

19 Claims, 32 Drawing Sheets

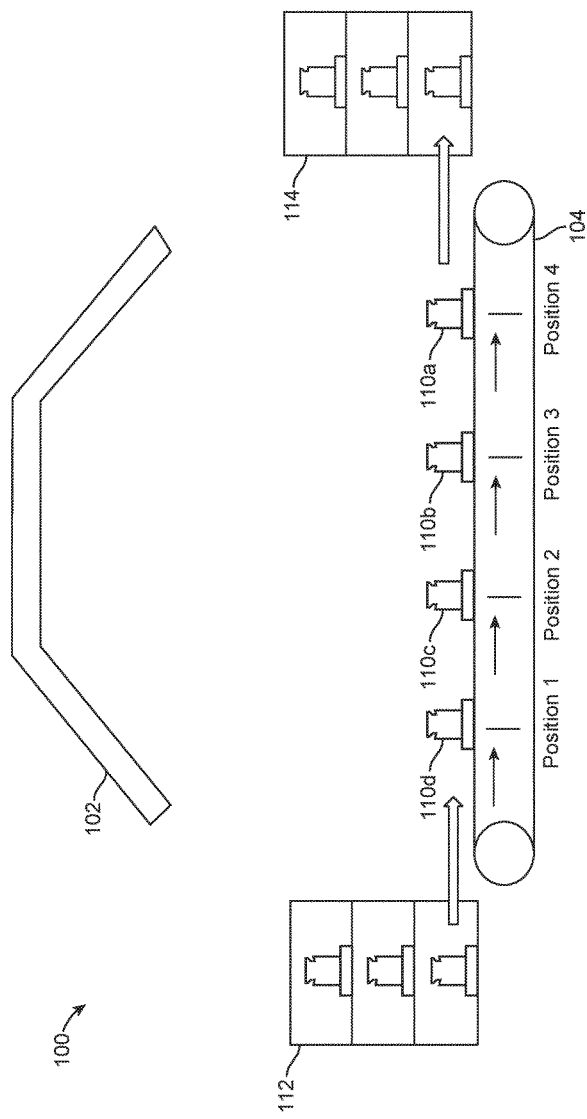

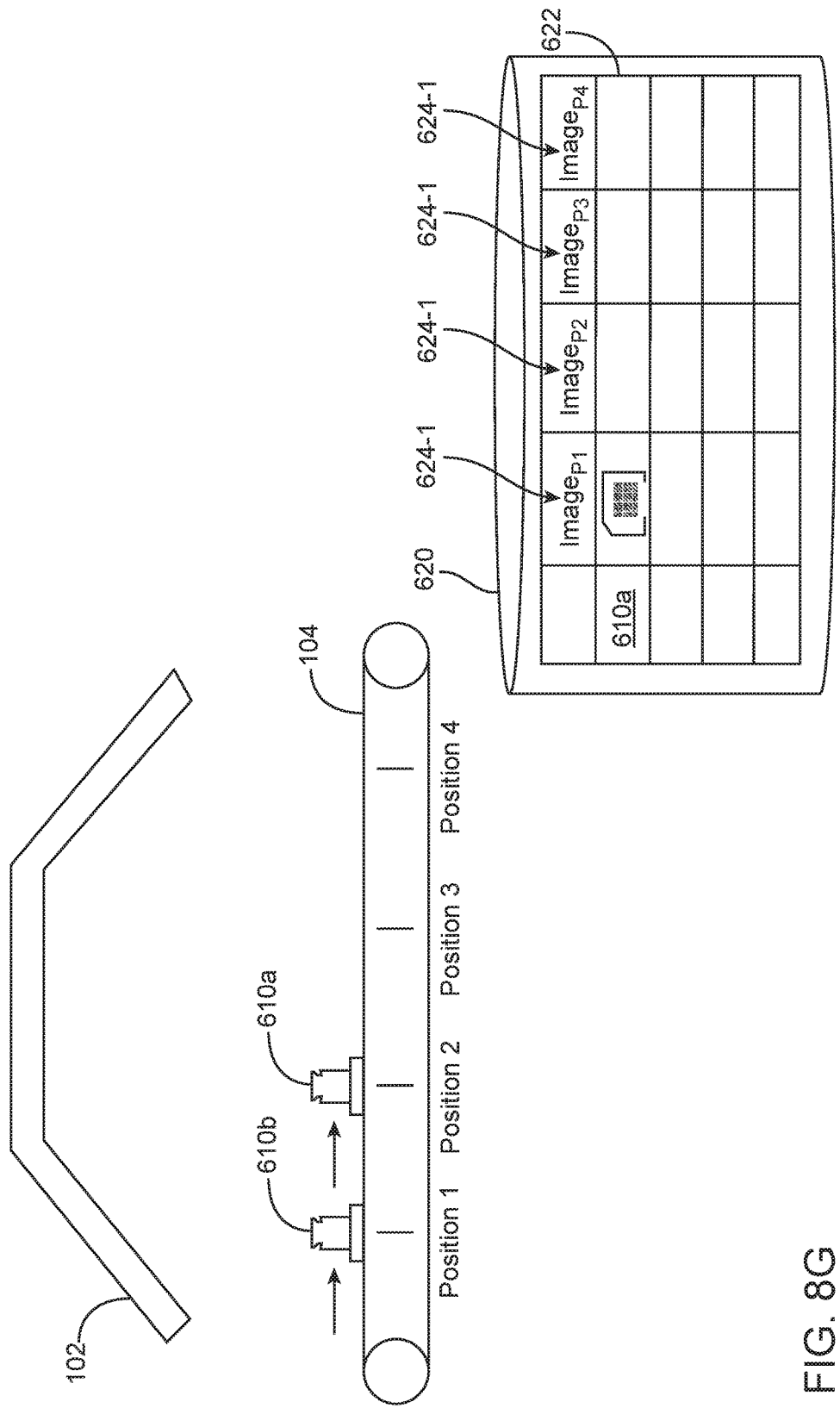

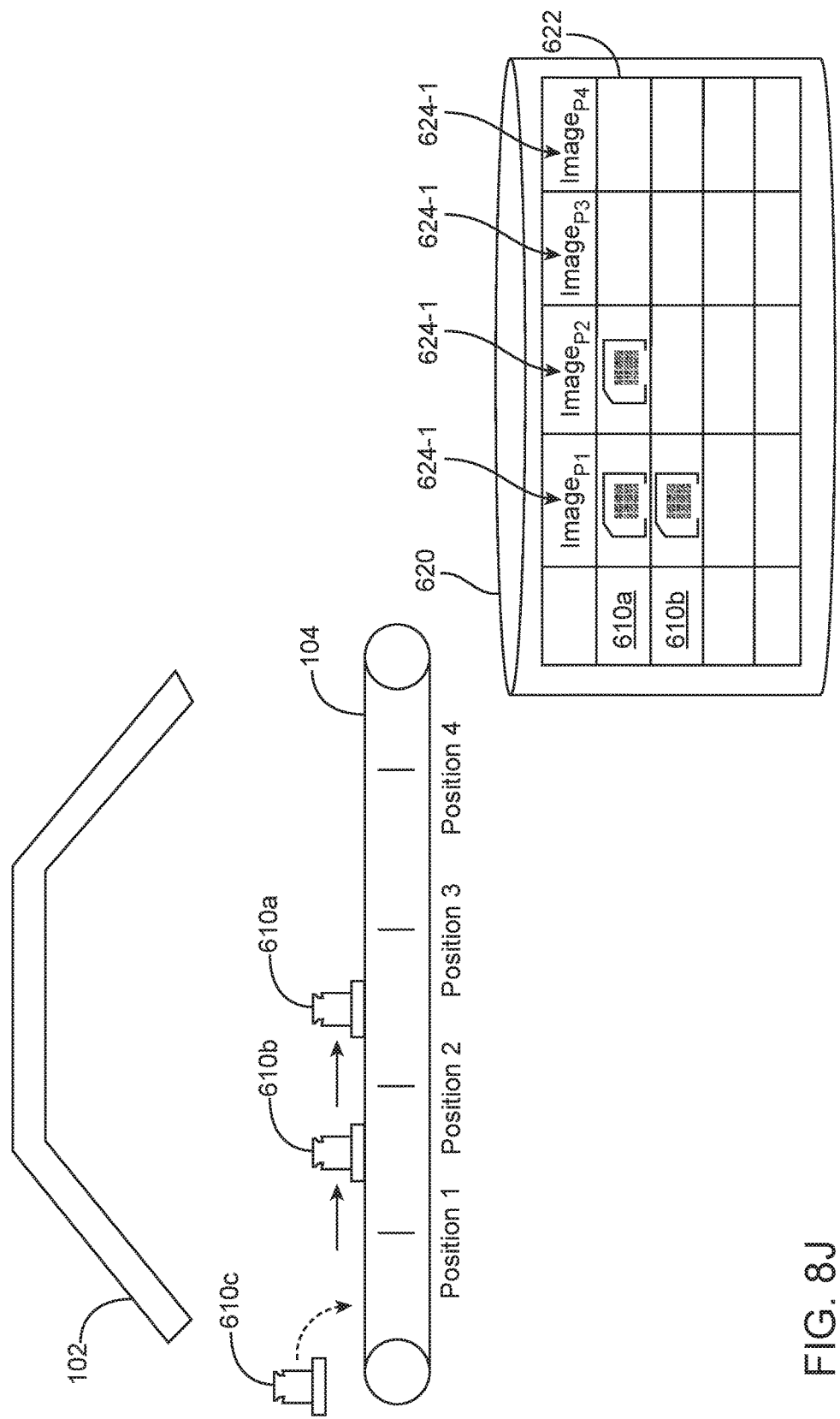

CAMERA CALIBRATION SYSTEM, TARGET, AND PROCESS

RELATED APPLICATION

The present application claims the benefit under 35 U.S.C § 119 to U.S. provisional patent application Ser. No. 62/355,805 filed Jun. 28, 2016. The foregoing application is hereby incorporated by reference into the present application in its entirety.

FIELD OF THE INVENTION

The present application generally relates to systems and methods for camera calibration to facilitate interactive virtual and augmented reality for one or more users.

BACKGROUND

A camera is a device that is often employed to capture images or video. The data captured by the camera is used in a variety of different purposes and contexts. For example, a wearable device may include one or more onboard cameras to provide image data for the surrounding environment around the user of that wearable device. One example is the stereoscopic wearable glasses that features two forward-oriented cameras configured to capture images for an augmented reality presentation to the user through stereoscopic displays. The wearable glasses may also include backwards-oriented cameras to capture images of the user's eyes.

Camera calibration is often performed to ensure the precision and accuracy of camera, as well as the information extracted from the image data captured by the camera. The camera calibration process determines the true parameters of a camera device that produces an image, which allows for determination of calibration data of the camera such as intrinsic parameters and extrinsic parameters. The intrinsic parameters include, but are not limited to, focal point, focal length, principal point, and distortion coefficients. The extrinsic parameters include, but are not limited to, positional relationships between multiple cameras, and translational and rotational offsets between sensors.

Conventionally, the camera calibration process is performed by manually moving a single checkerboard target through a large set of different poses. At each pose, the checkerboard target is held completely still while the camera captures an image of the target, while ensuring that the entirety of the checkerboard is maintained within the camera's field of view. The cycle continues until all of the poses have been processed.

There are numerous disadvantages with this type of calibration process, since this approach is extremely laborious and time consuming. Moreover, the requirement to move the target through the numerous poses introduces significant possibility of variability into the calibration process and increased inability to obtain repeatable results unless costly and complicated target movement devices are introduced, which creates yet more expense and complications for the calibration process. These problems mean that the conventional camera calibration process is unusable in a high-volume manufacturing where large numbers of cameras need to be calibrated in a time-efficient and repeatable manner.

Therefore, there is a need for an improved approach to implement camera calibration.

SUMMARY

Embodiments of the invention provide an improved method, system, and apparatus to perform camera calibration, where cameras are mounted onto a moving conveyance apparatus to capture images of a multi-planar calibration target. The multi-planar calibration target is a backlighted target in some embodiments. The calibration process is optimized by reducing the number of images captured while simultaneously preserving overall information density.

In one embodiment, a target for camera calibration includes a tessellated concave structure having a plurality of planar regions. Some or all of the planar regions having thereon a plurality of individualized markers. The tessellated concave structure having a radius of curvature formed by angled joins from the plurality of planar regions.

In one or more embodiments, the radius of curvature of the target corresponds to Aruco or Charuco targets. The target may also include a backlight. Each of the plurality of planar regions may include a hexagonal shape. The target may also include a mounting bracket to mount the target at a fixed orientation.

In another embodiment, a system for performing camera calibration includes a movable platform having a mounting surface to hold a plurality of cameras and a tessellated concave target having a plurality of planar target regions such that a principle axis of the tessellated concave target is oriented towards the movable platform. The movable platform may be spaced apart from the tessellated concave target.

In one or more embodiments, the movable platform may be a conveyer belt. The movable platform may be spaced apart from the tessellated concave target at a distance corresponding to a focal distance of the plurality of cameras. The system may also include an input stack mechanism to load a camera onto the movable platform and an output stack mechanism to offload the camera off the movable platform.

In another embodiment, a method for performing camera calibration includes loading a plurality of cameras onto a movable platform. The plurality of cameras having camera image capture directions oriented towards a tessellated concave target having a plurality of planar target regions. The method also includes operating the movable platform to shift the plurality of cameras into designated positions relative to the target. The method further includes pausing movement of the movable platform to capture an image from each of the plurality of cameras when the plurality of cameras are located at the designated positions relative to the target. Moreover, the method includes calibrating the plurality of cameras using visual patterns observed from a collection of images captured by each camera at each of the designated positions.

In one or more embodiments, some or all of the planar target regions may include a plurality of individualized markers and the visual patterns may include images of the individualized markers and corner points of a checkerboard pattern. The images may undergo filtering. Calibrating of the plurality of cameras may include identification of individualized markers from the image. The individualized markers may correspond to Aruco or Charuco targets. Calibrating of the plurality of cameras may include deriving intrinsic and extrinsic parameters for the plurality of cameras.

In another embodiment, a computer readable medium having stored thereon a sequence of instructions which, when executed by a processor causes the processor to execute a method for performing camera calibration, the method includes loading a plurality of cameras onto a movable platform. The plurality of cameras having camera image capture directions oriented towards a tessellated concave target having a plurality of planar target regions. The method also includes operating the movable platform to shift the plurality of cameras into designated positions relative to the target. The method further includes pausing movement of the movable platform to capture an image from each of the plurality of cameras when the plurality of cameras are located at the designated positions relative to the target. Moreover, the method includes calibrating the plurality of cameras using visual patterns observed from a collection of images captured by each camera at each of the designated positions.

In one or more embodiments, some or all of the planar target regions may include a plurality of individualized markers. The visual patterns may include images of the individualized markers and corner points of a checkerboard pattern. The images may undergo filtering. Calibrating of the plurality of cameras may include identification of individualized markers from the image. The individualized markers may correspond to Aruco or Charuco targets. Calibrating of the plurality of cameras may include deriving intrinsic and extrinsic parameters for the plurality of cameras.

Each of the individual embodiments described and illustrated herein has discrete components and features that may be readily separated from or combined with the components and features of any of the other several embodiments.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments of the invention will now be described, by way of example only, with reference to the accompanying drawings.

FIGS. 1A and 1B illustrate an example system to perform camera calibration according to some embodiments of the invention.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1B:
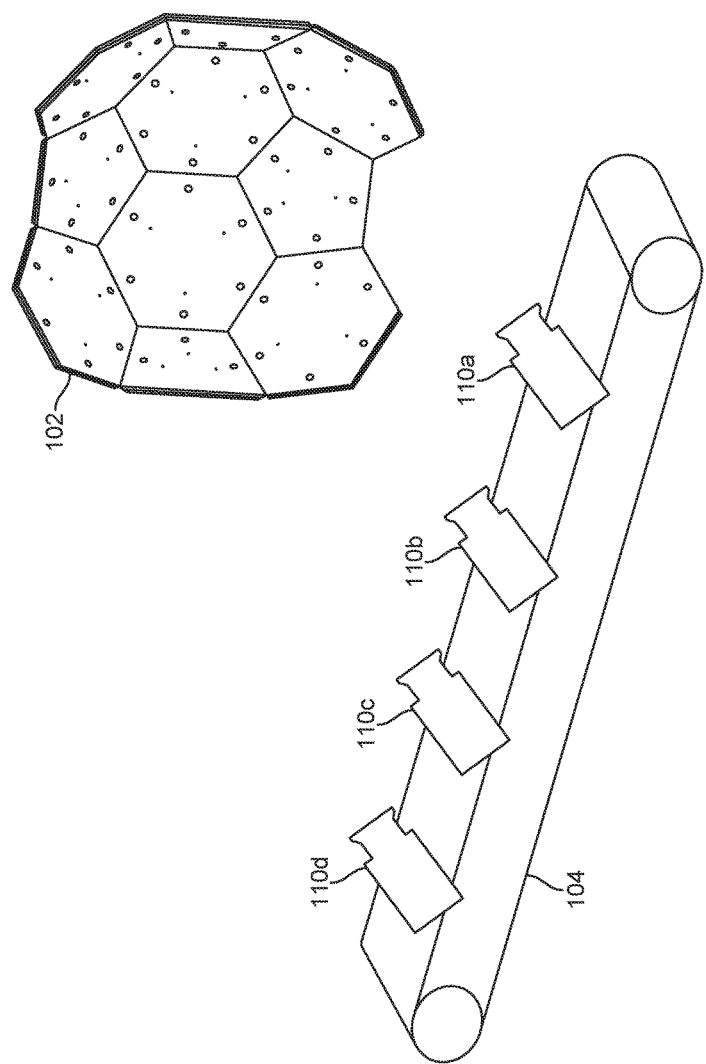

FIGS. 1A and 1B illustrate an example system 100 to perform camera calibration according to some embodiments of the invention. System 100 provides a multi-camera approach for performing calibration, where a movable platform device (e.g., conveyer belt 104) includes multiple placement positions for multiple cameras. In the system 100 illustrated in FIGS. 1A and 1B, conveyer belt 104 includes four positions (positions 1, 2, 3, and 4) for four cameras 110a-d to undergo concurrent calibration at any given moment in time. It is noted, however, that alternative embodiments of the invention may include multi-camera calibration platforms that can hold any number of cameras to simultaneously undergo calibration, and the invention is therefore not limited to any particular number of cameras for concurrent calibration unless specifically claimed as such.

The target 102 comprises a generally partial-spherical shape having multiple planar targets portions located thereon. A full-FOV (field of view) target ensures that all sections of the imager are covered by detectable points, where the imager corresponds to the sensor (e.g., CMOS or CCD sensor) inside the camera that converts the incoming light into digital output signals. In some embodiments, the target 102 comprises a tessellated-sphere target having a spherical radius that is set at the focal distance of the cameras 110a-d.

In operation, cameras to be calibrated are loaded onto the conveyer belt 104 from an input stack 112. At any given moment in time, a plurality of cameras are positioned on the conveyer belt 104. Each of the cameras are located at a designated position, spaced apart from one another at a set distance, with their image capture direction facing the target 102.

The conveyer belt 104 operates to shift the location of the cameras from the direction of the input stack 112 to the direction of the output stack 114. The movement of the conveyer belt 104 is paused when the cameras reach set positions for calibration. As shown in this figure, the conveyer belt 104 is paused when camera 110d is located as position 1, camera 110c is located at position 2, camera 110b is located at position 3, and camera 110a is located at position 4.

When the conveyer is paused, each camera at its respective position then captures an image of the target 102. After an image has been captured by each camera, the conveyer moves again such that the cameras shift to their next succeeding positions to capture another image of the target 102. In this manner, each camera will successively capture an image of the target 102 from each of the positions 1, 2, 3, and 4. Once the camera has completed taking an image from each position 1-4, the next shifting of its position will cause that camera to be placed into the output stack 114.

The images captured by the cameras include some or all of the marker planes within the target 102. As discussed in more detail below, calculations are performed from the contents of the captured images to calibrate the cameras, e.g., by determining the intrinsic and extrinsic parameters for the cameras.

This approach ensures that a large variety of angled planes are detectable in each shot, which is valuable for robust calibration results. It also ensures, for wide-angle lenses such as those present on space-constrained applications such as head mounted tracking systems, that the maximum number of target surfaces are in focus per shot. Alternative attempts to perform multi-planar capture, such as the Aquifi single image calibration rig, require substantially larger footprints and do not fully cover the FOV of the camera(s) under test.

Figure 2:
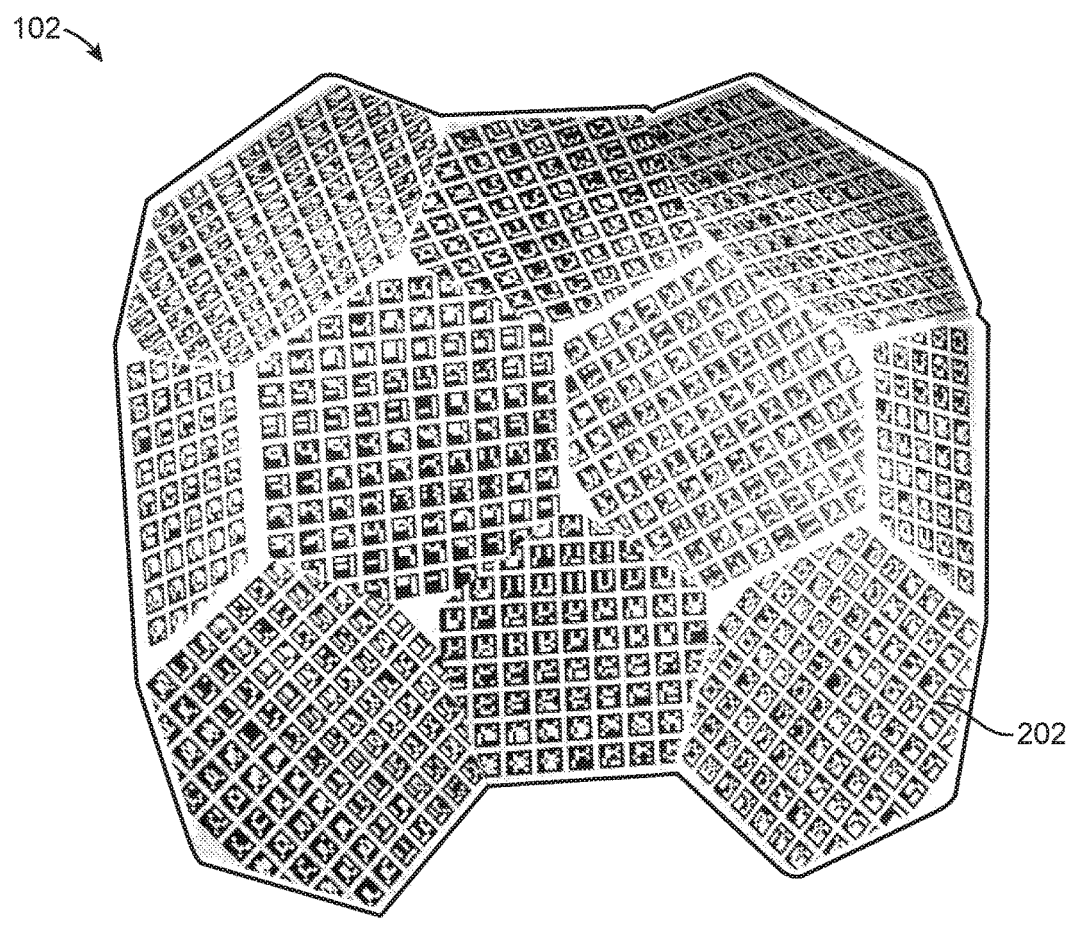
FIG. 2 provides an illustration of the interior of a multi-planar target according to some embodiments of the invention.
Figure 3A:
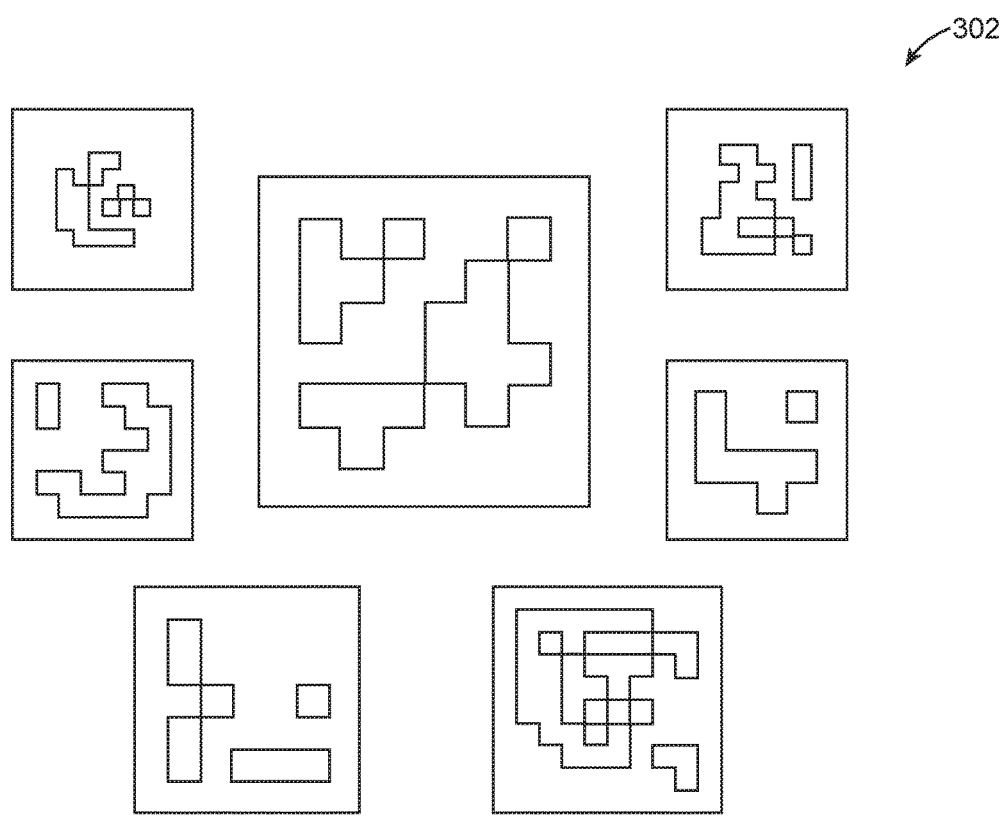
FIG. 3A shows exemplary Aruco markers and FIG. 3B shows an exemplary haruco target.

FIG. 2 provides an illustration of the interior of a target 102 according to some embodiments of the invention. In some embodiments, the target 102 is a multi-faceted structure comprised of multiple planar regions, where each facet/planar region 202 includes a respective planar target. In some embodiments, the planar target is implemented as a Charuco or Aruco target. Example Aruco markers are illustrated in FIG. 3A. The main difference between Aruco/Charuco targets and the typical checkerboard target is that the Aruco/Charuco targets includes individual markers that are distinct from one another.

Each of the Aruco/Charuco targets include patterns/markers that uniquely identify a given marker and its position in space. Since the Aruco/Charuco targets are composed of individual markers, this means that the camera does not need to see the entirety of the target in its complete form in order to obtain calibration points. Instead, the camera can only partially capture the image of the target and still be able to perform calibration from that target.

Figure 3B:
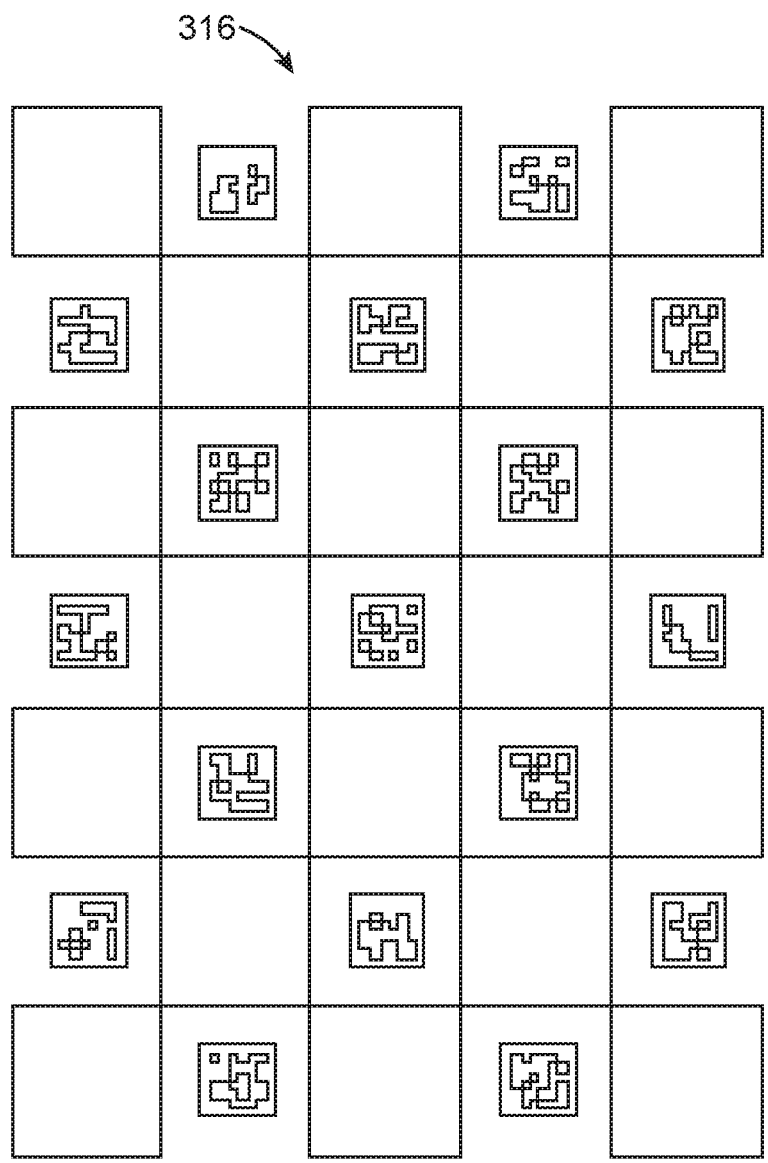

Unlike the Aruco target, the Charuco target combines the individual marker aspect of the Aruco target with the use of a checkerboard. This approach serves to improve localization determinations for certain types of calculations. FIG. 3B illustrates an example Charuco target 316.

The use of Charuco or Aruco targets ensures that an image capture remains valid even if the entire target is not in frame. This may occur, for example, if a series of cameras were continuously being moved past a stationary target as illustrated in FIGS. 1A-B. This aspect of some embodiments of the invention therefore provides a distinct advantage over alternative approaches that use standard checkerboard targets, which require precise registration of the camera(s), as well as tightly controlled lighting, due to the need to have all targets and sub-elements clearly visible in each shot.

Figure 4A:
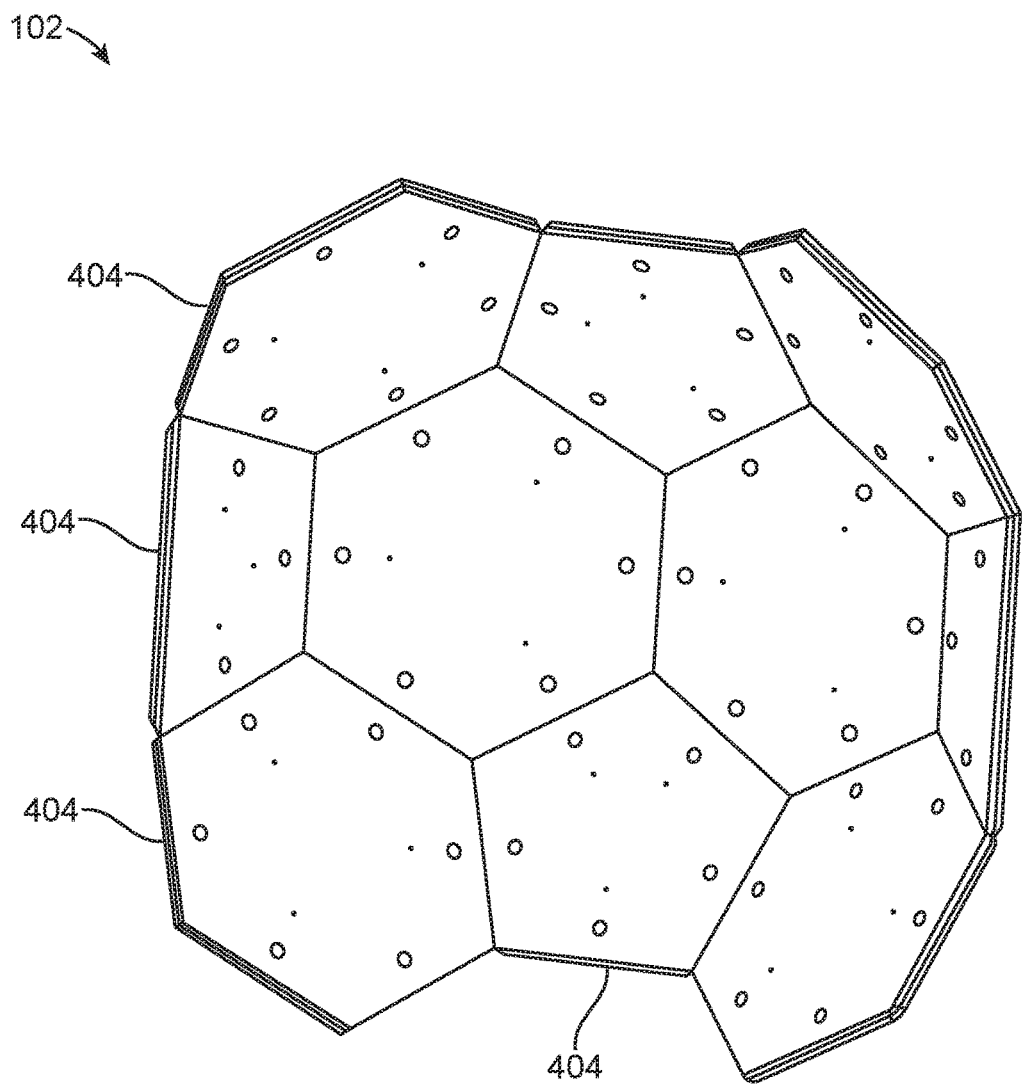
FIGS. 4A-C illustrate the framework for a target according some embodiments of the invention.
Figure 4B:
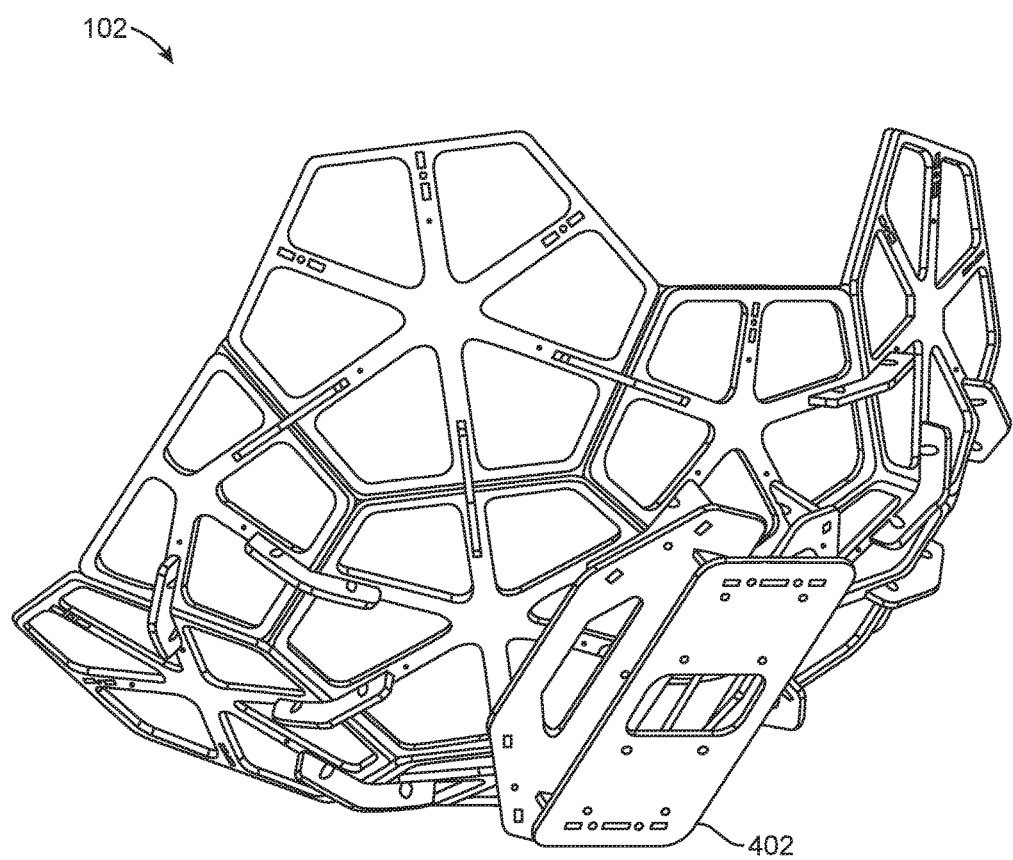
Figure 4C:
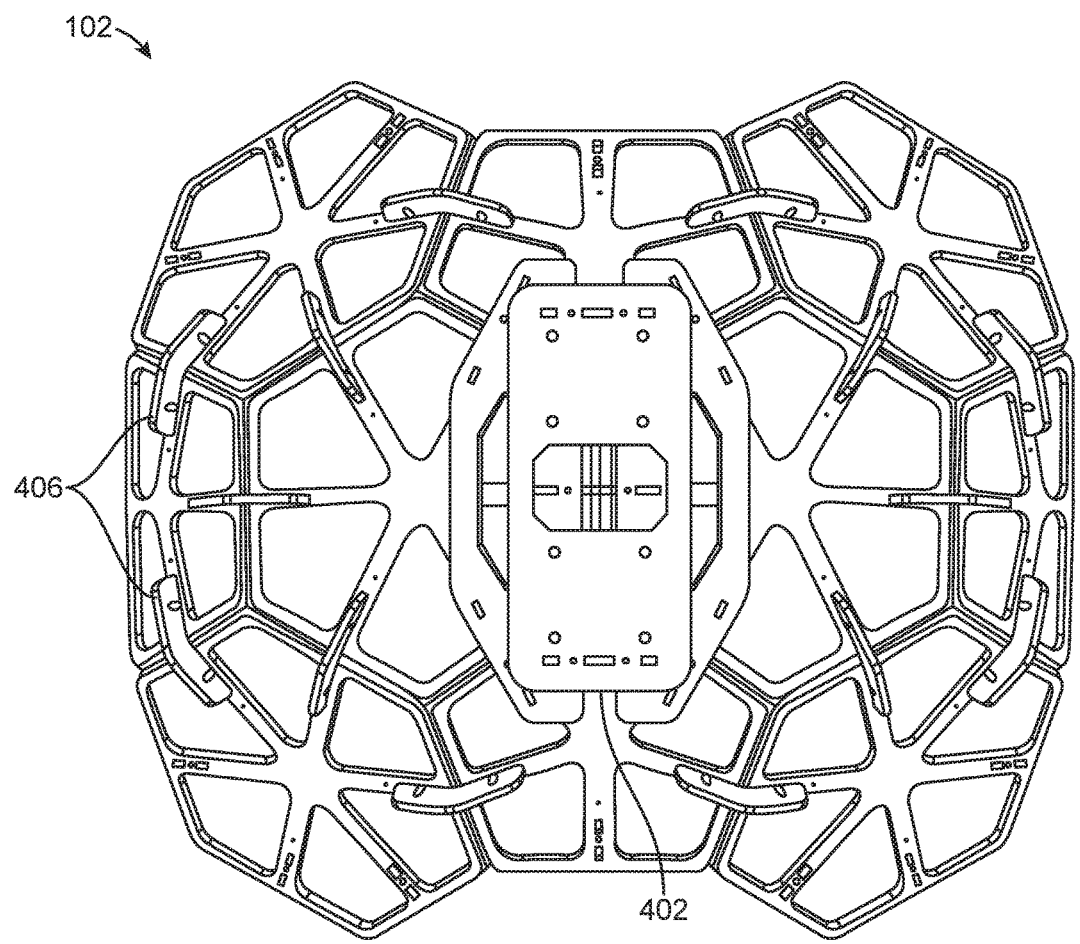

FIGS. 4A-C illustrate the framework for a target 102 according some embodiments of the invention. FIG. 4A is a front view of the target 102, looking into the concave/spherical interior of the target 102.

A plurality of faceted/tessellated planar portions 404 are stacked edge-to-edge at consistent angular transitions to form the target 102. Each of the faceted planar portions 404 may be formed as a hexagonal structure, although other polygonal shapes are also within the scope of the invention. The angle of the joining between each of the faceted planar portions 404 is determined by the desired radius of the overall partial-spherical shape for the target 102. As previously noted, in one embodiment, the radius is configured to generally match the focal distance of the cameras being calibrated.

The size of the faceted planar portions 404 is determined by the desired overall size of the Charuco or Aruco target to be placed onto each facet and/or the number of individual markers to be placed onto each facet.

FIGS. 4B and 4C show a mounting bracket 402 that is attached to the back of the target 102 to mount the target 102 at a given position and orientation relative to the conveyer belt. It is noted that since the cameras on the conveyer belt are capable of moving relative to the target 102, this means that the target does not need to be positionally adjusted during the calibration process to permit the cameras to capture images of the target from multiple poses. Therefore, mounting bracket 402 can be configured as a locked-position bracket that is both structurally strong as well as efficiently manufacturable.

Brackets 406 are employed to attach each planar portion to its adjacent planar portion. These brackets 406 comprise any suitable configuration that can serve to securely hold one planar portion in a fixed position relative to its neighboring planar portion. In some embodiments, bracket 406 comprises an angled indented shape to mount the planar portions 404 at the appropriate join angle relative to its neighboring planar portion.

Figure 5:
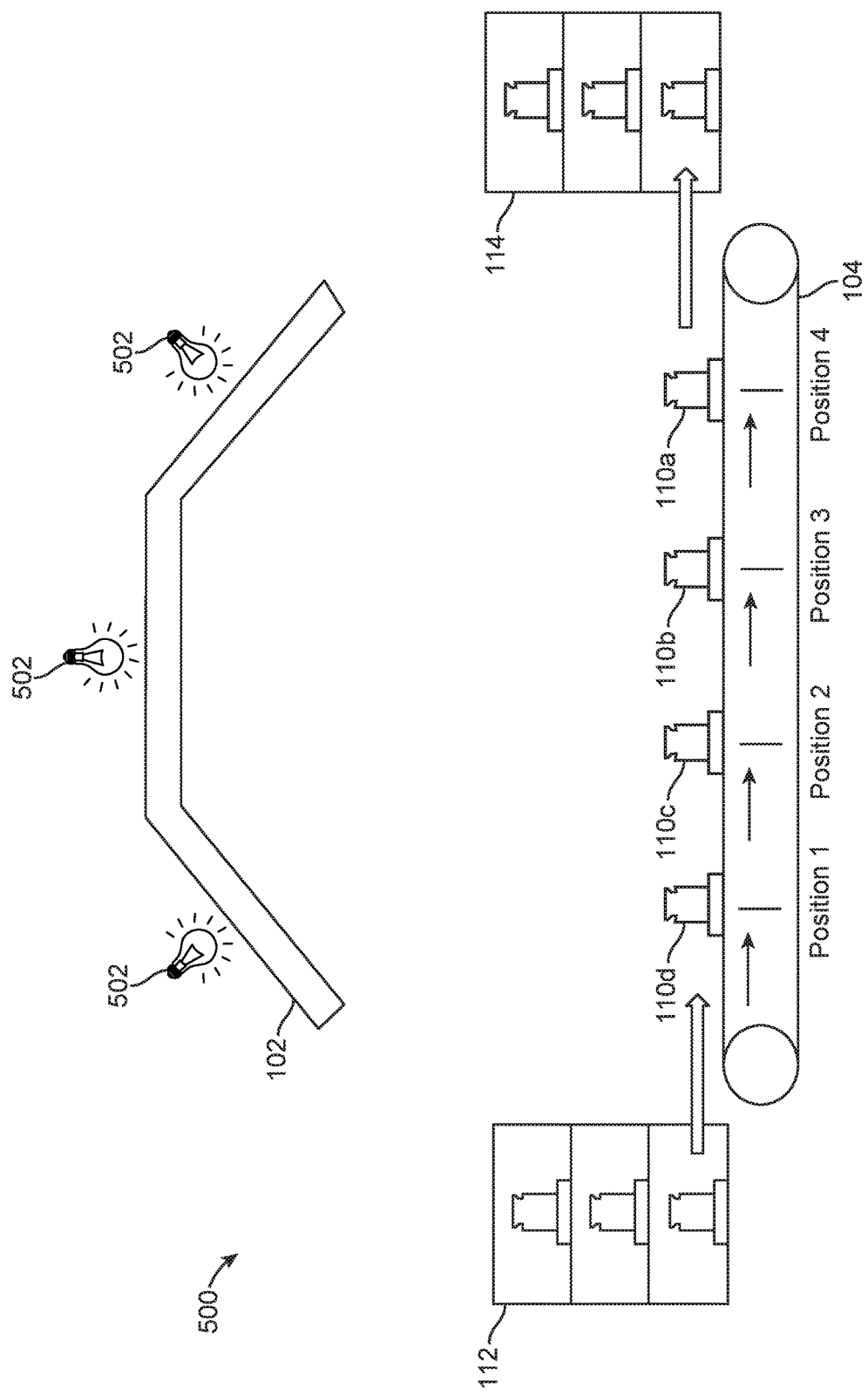
FIG. 5 illustrates an embodiment of a calibration system having a backlighted target.

FIG. 5 illustrates an embodiment of a calibration system 500 having a backlighted target 102, where one or more light sources 502 are provided to as a backlight to target 102. By using a strong backlight behind a white target with black checkerboard/Aruco/Charuco markers on it, the gain and exposure settings can be reduced to their minimum settings on a camera under test, resulting in a low-noise, motion-stable image for calibration. With sufficient intensity, this also serves to mask non-illuminated elements from the image, which increases the robustness of marker detection and/or reduces motion blur. In some embodiments, the target is opaque, although other embodiments may employ targets having a range of different transparency levels.

In this way, specularity is significantly reduced and/or entirely eliminated. This is because specularity generally occurs from outside reflections, which may wash out perception of the images of the target, e.g., where a white "smear" across the image occurs during the calibration process. Since the backlighted target is relatively bright, this permits the camera exposure to be a low enough level such that the only detectable illumination is from the target, which significantly minimizes any specularity. In addition, the entire calibration process can be performed faster, due to increased detection speed from the faster exposure settings, which serves to increase the throughput of the overall calibration system.

Figure 6:
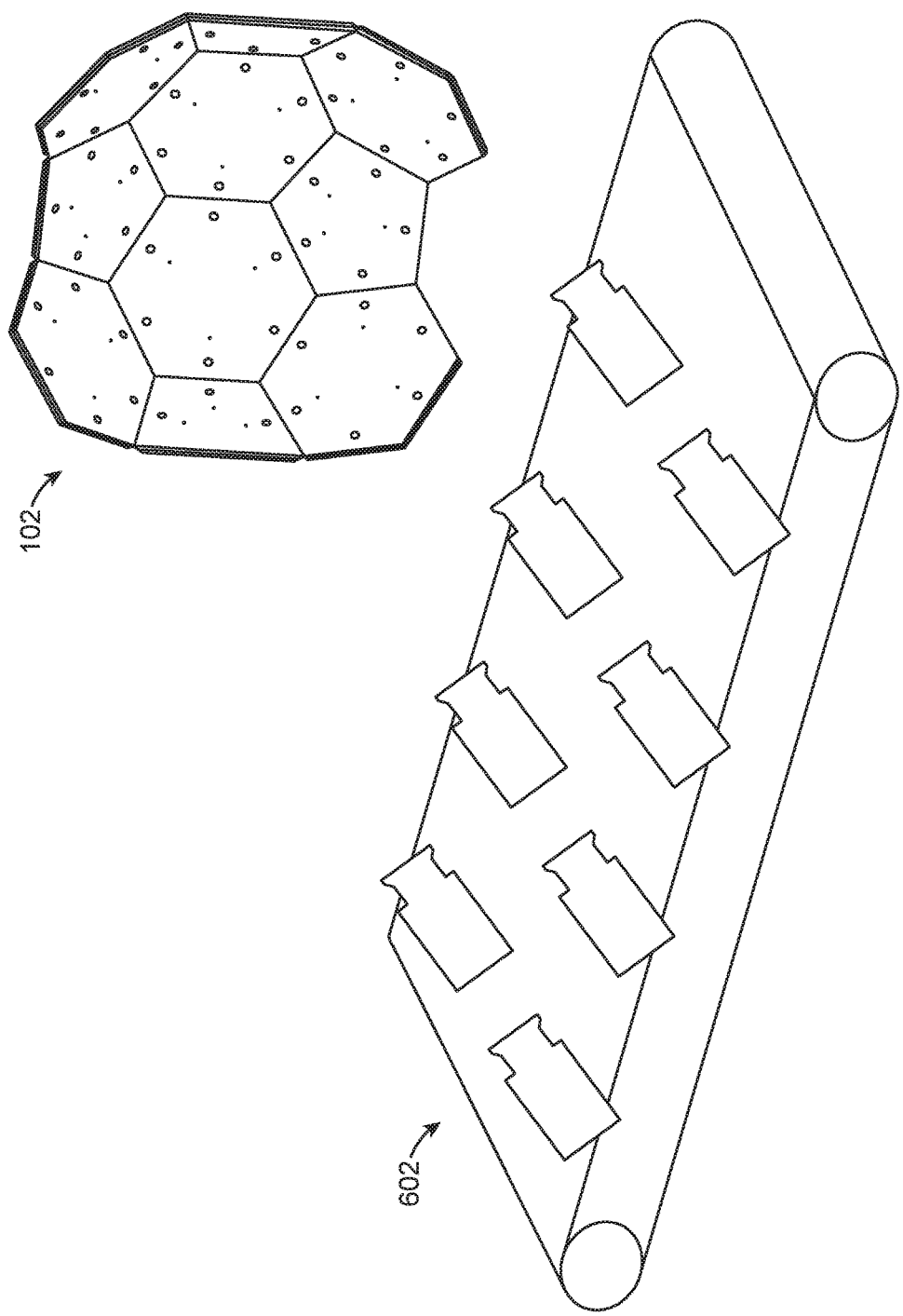
FIG. 6 illustrates an example approach where an array of multiple rows of cameras are placed onto one or more conveyer belts to capture images of the target.

Depending upon the throughput requirements for the calibration system, multiple rows of cameras can undergo calibration in some embodiments of the invention. FIG. 6 illustrates an example approach where an array 602 of multiple rows of cameras are placed onto one or more conveyer belts to capture images of the target 102. The target 102 is positioned and/or configured to ensure that the focal point of the cameras in the array 602 are properly oriented at the target 602. Since each camera is at a known location and offset from each planar target surface of the target 102, this means that the techniques described herein are fully usable to perform calibration in this embodiment.

Figure 7:
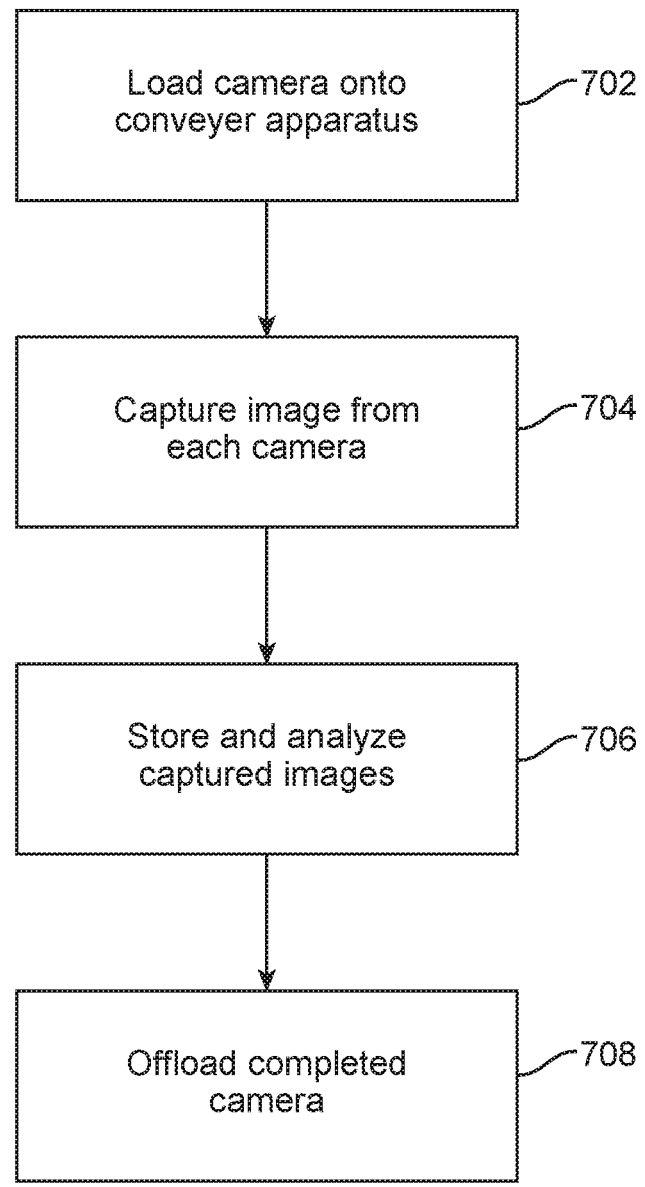
FIG. 7 shows a flowchart of an approach to perform camera calibration.

FIG. 7 shows a flowchart of an approach to perform camera calibration using the apparatus and system described above. At 702, a camera is loaded onto the conveyer apparatus at a designed position on the conveyer apparatus. As previously noted, the cameras to be calibrated may be loaded onto the conveyer belt from an input stack, where at any given moment in time, a plurality of cameras are potentially positioned on the conveyer apparatus. Each of the cameras are located at a designated position, spaced apart from one another at a specified distance, with their image capture direction facing the target.

At 704, an image is captured of the target from each of the cameras on the conveyer apparatus. The conveyer apparatus is used to move the location(s) of the cameras to each of the image capture positions in sequence. Therefore, a move-pause-image capture-move again cycle is repeated until each camera has taken an image from each designated position.

At 706, the captured images are stored in a computer readable medium. Calibration analysis can then be performed on image data to generate calibration parameters for the camera devices. Thereafter, at 710, the calibrated camera can be offloaded from the conveyer apparatus onto an output stack.

Figure 8A:
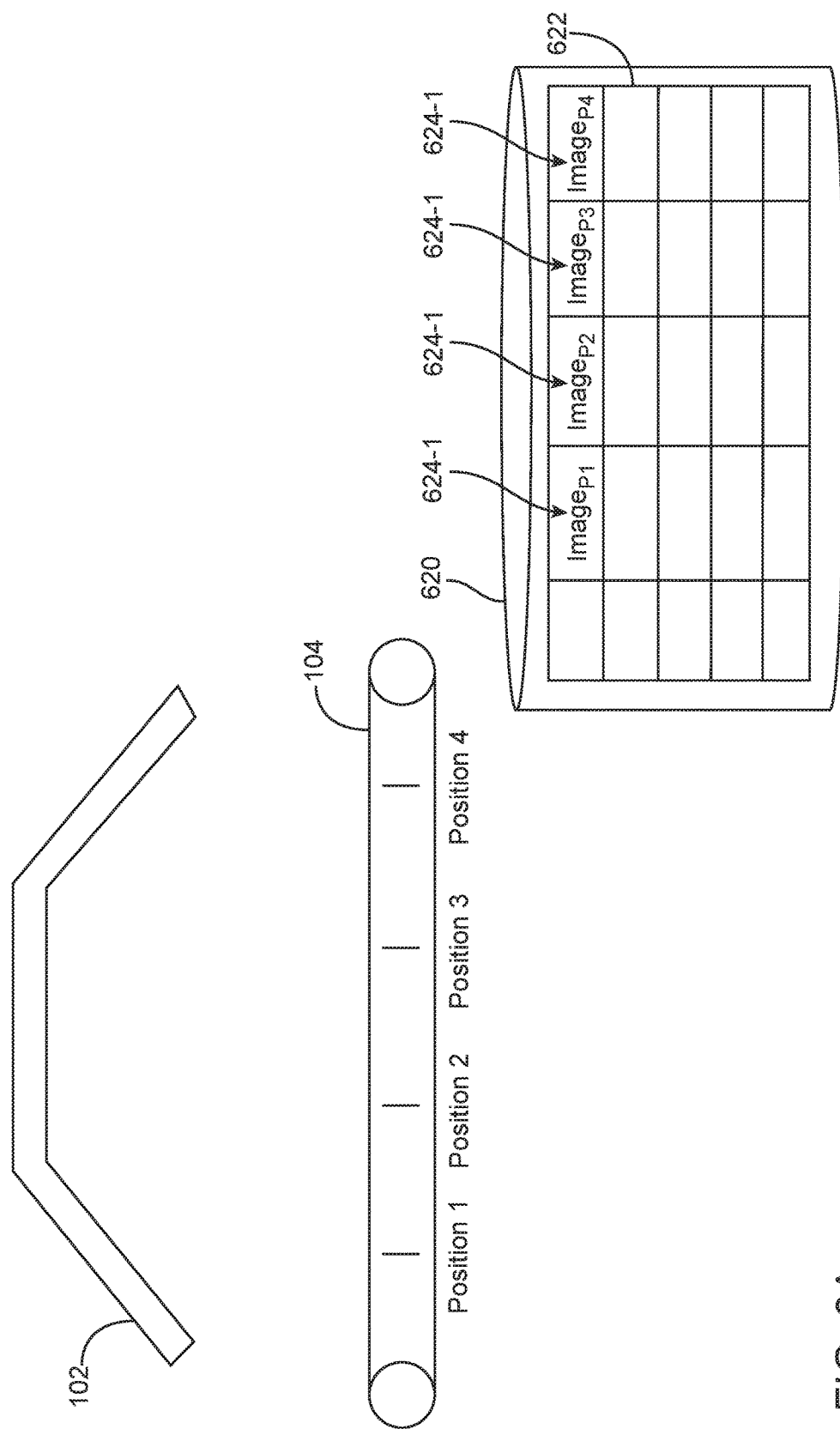
FIGS. 8A-8S provide an illustrative example for the calibration process according to some embodiments of the invention.
Figure 8B:
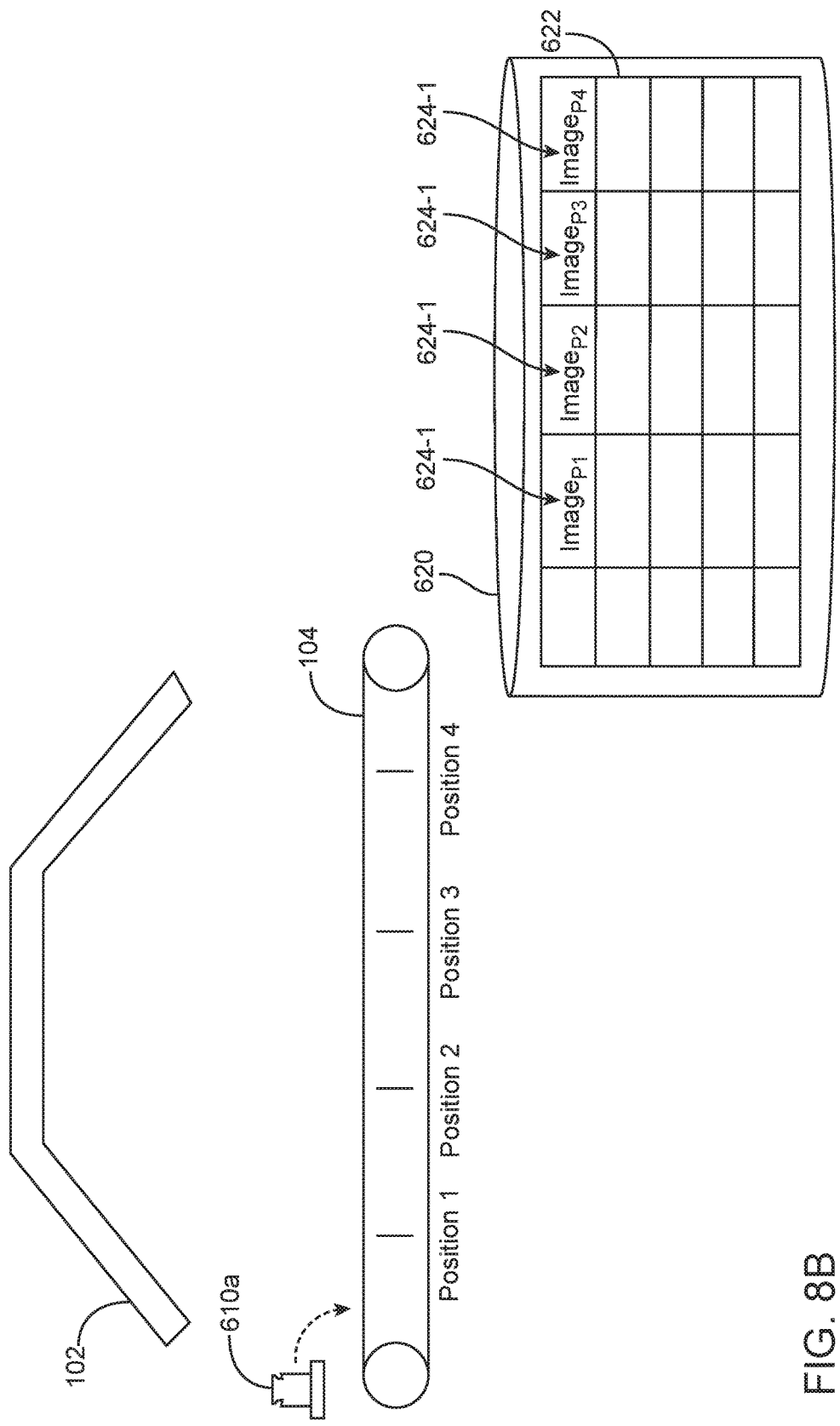
Figure 8C:
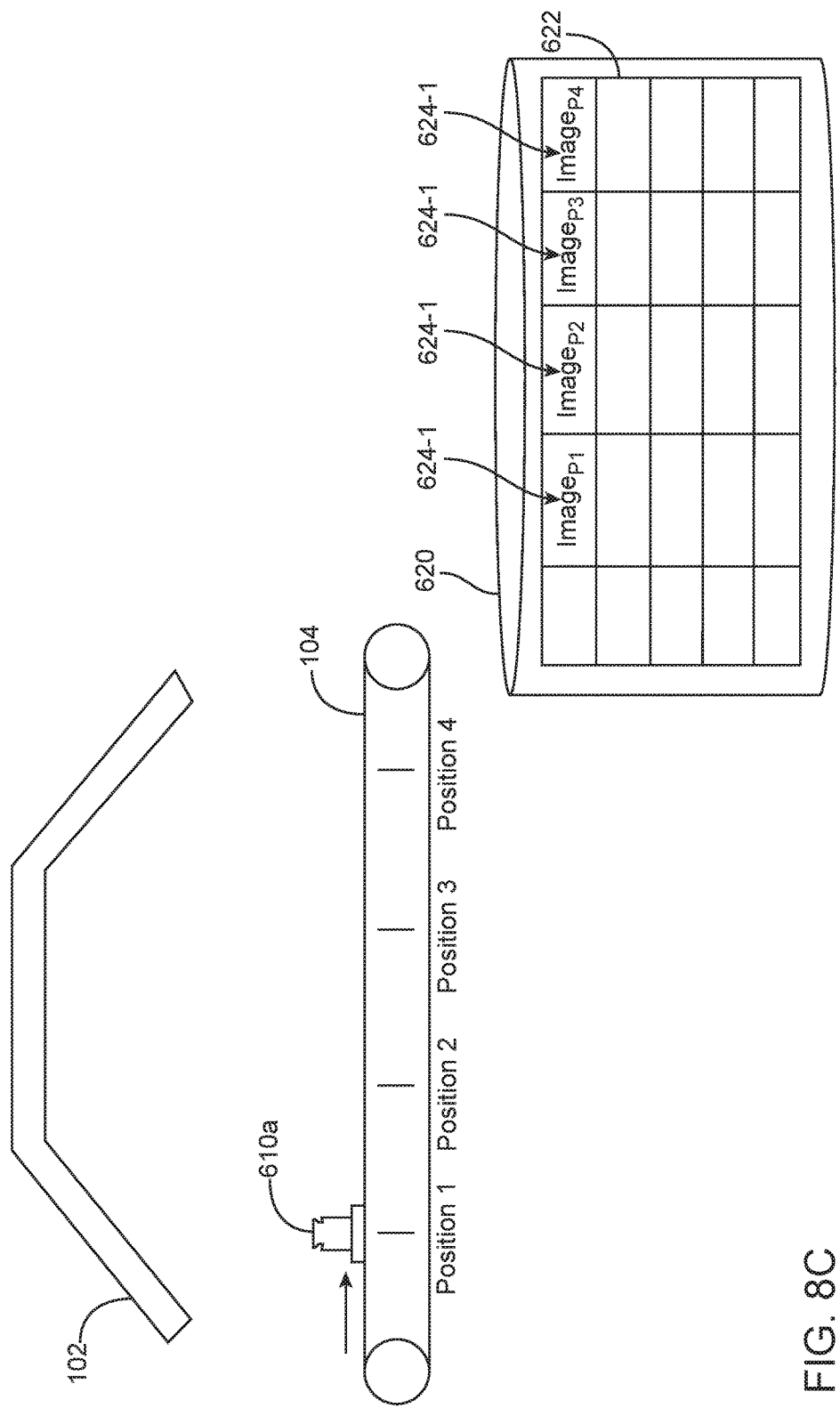
Figure 8D:
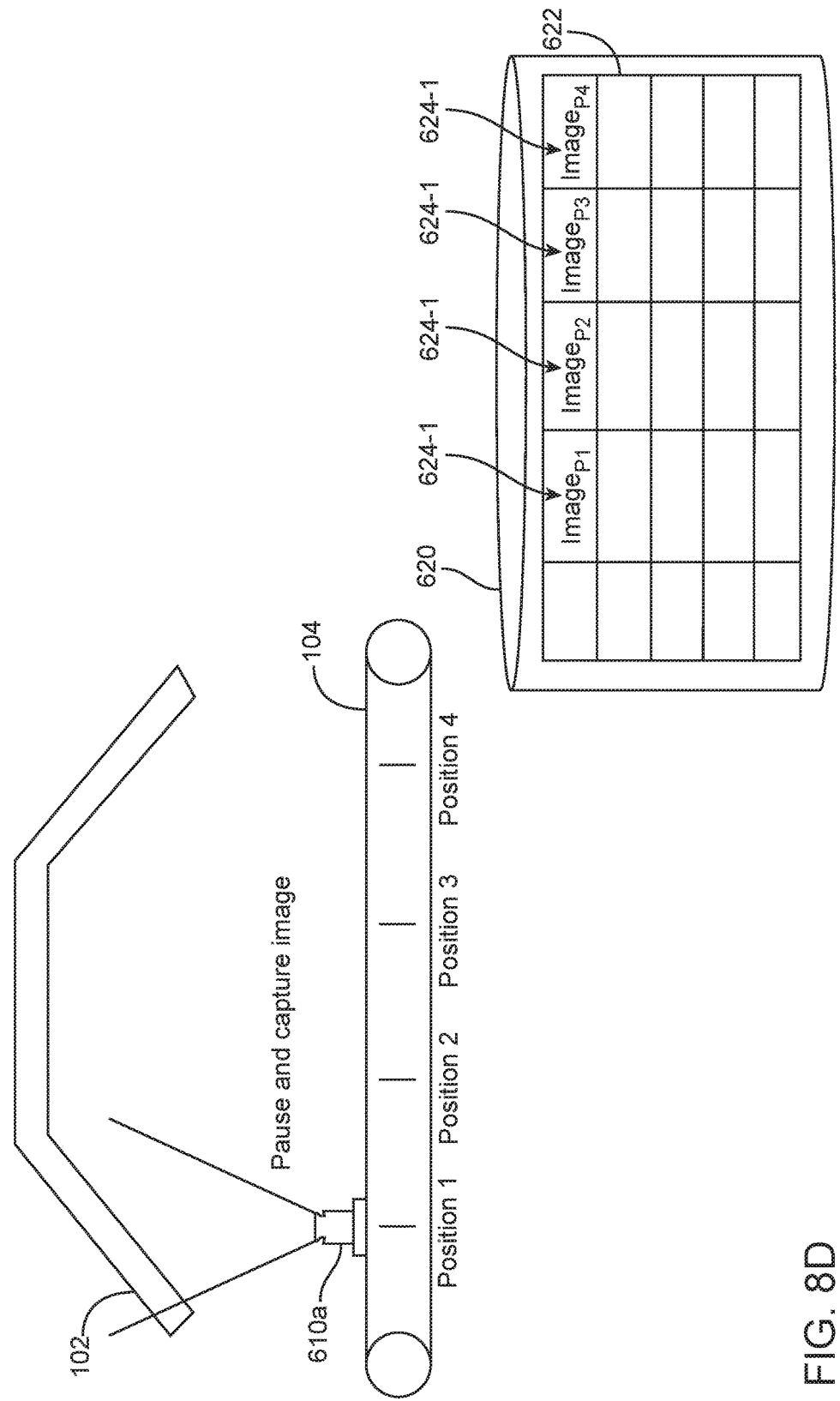
Figure 8E:
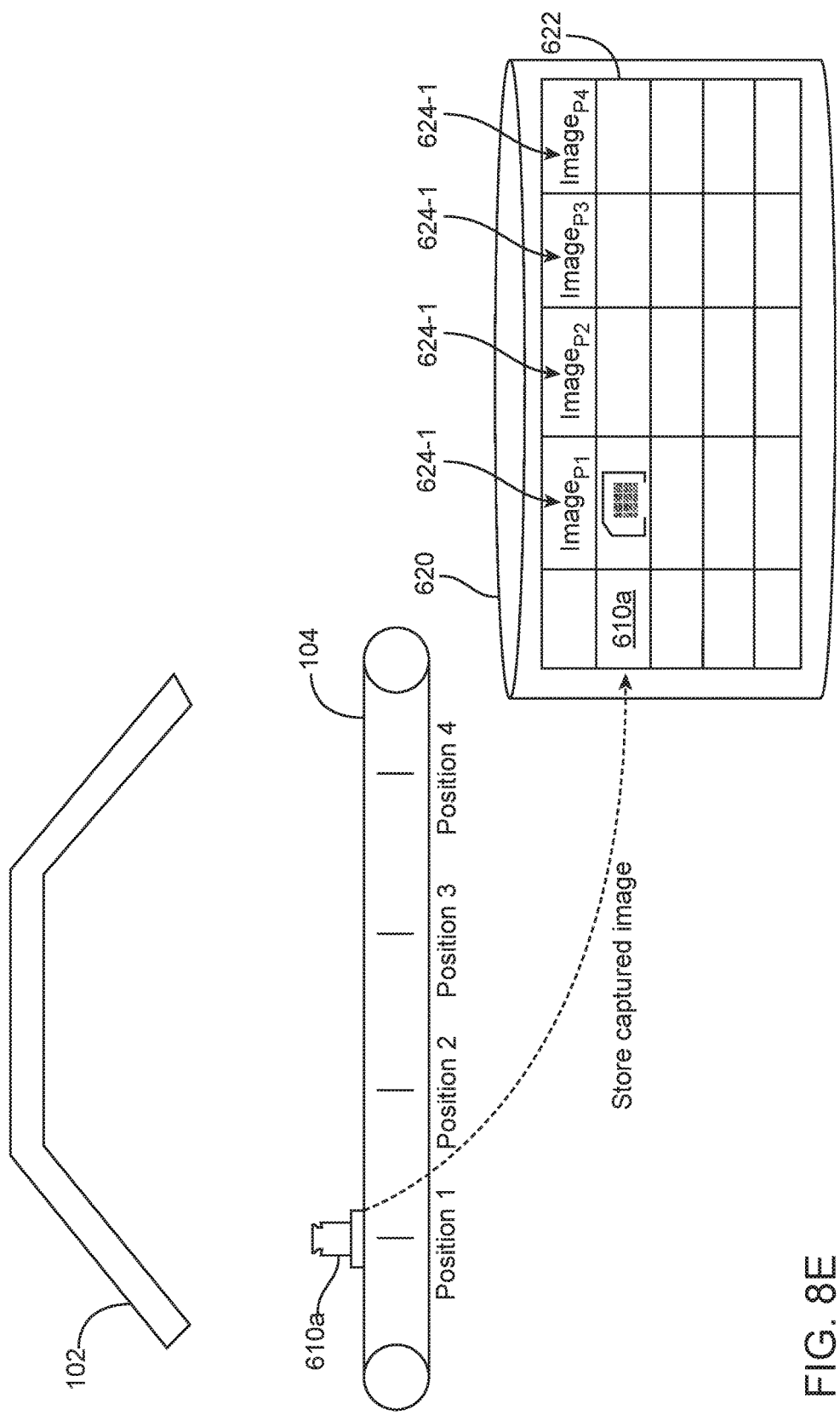
Figure 8F:
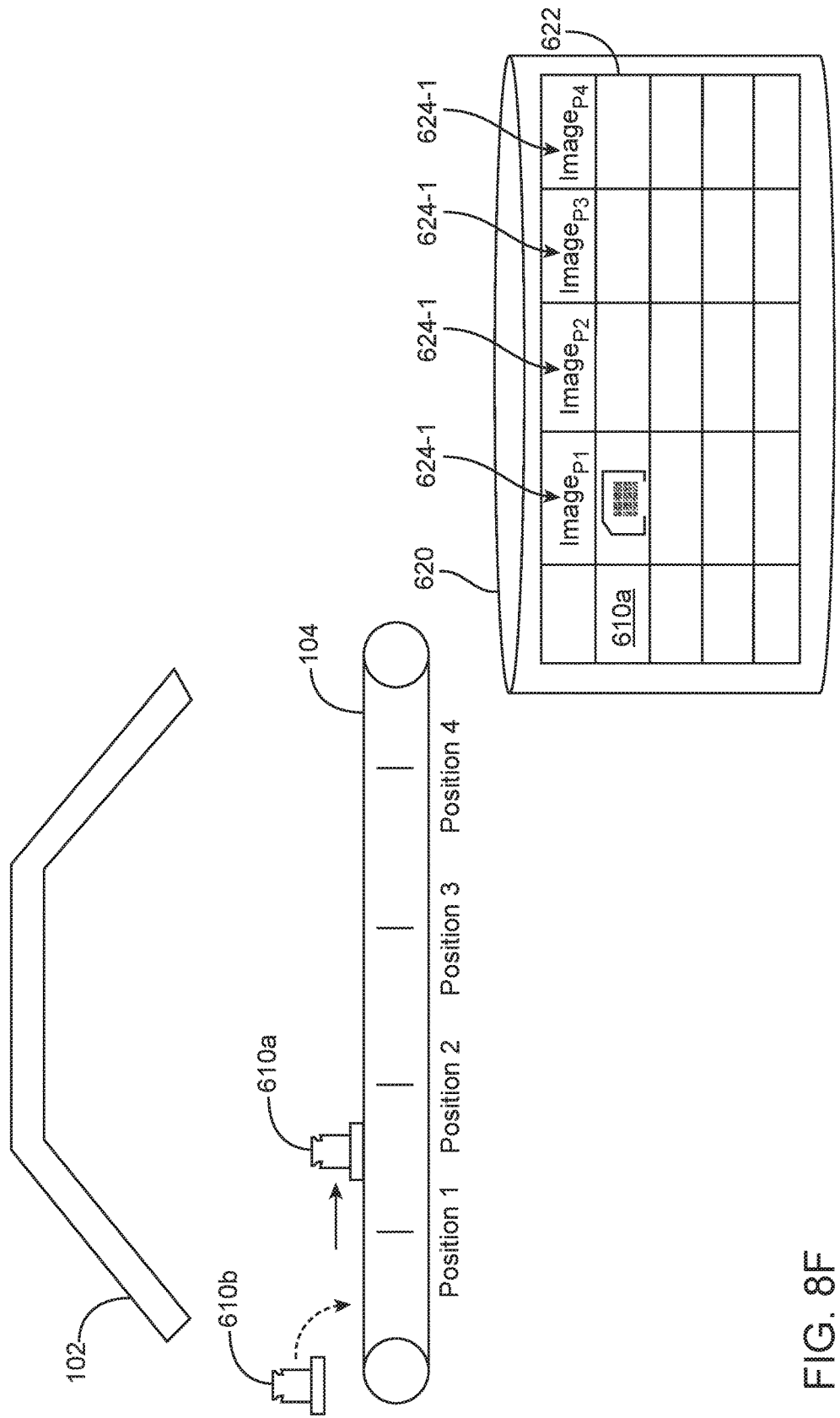
Figure 8H:
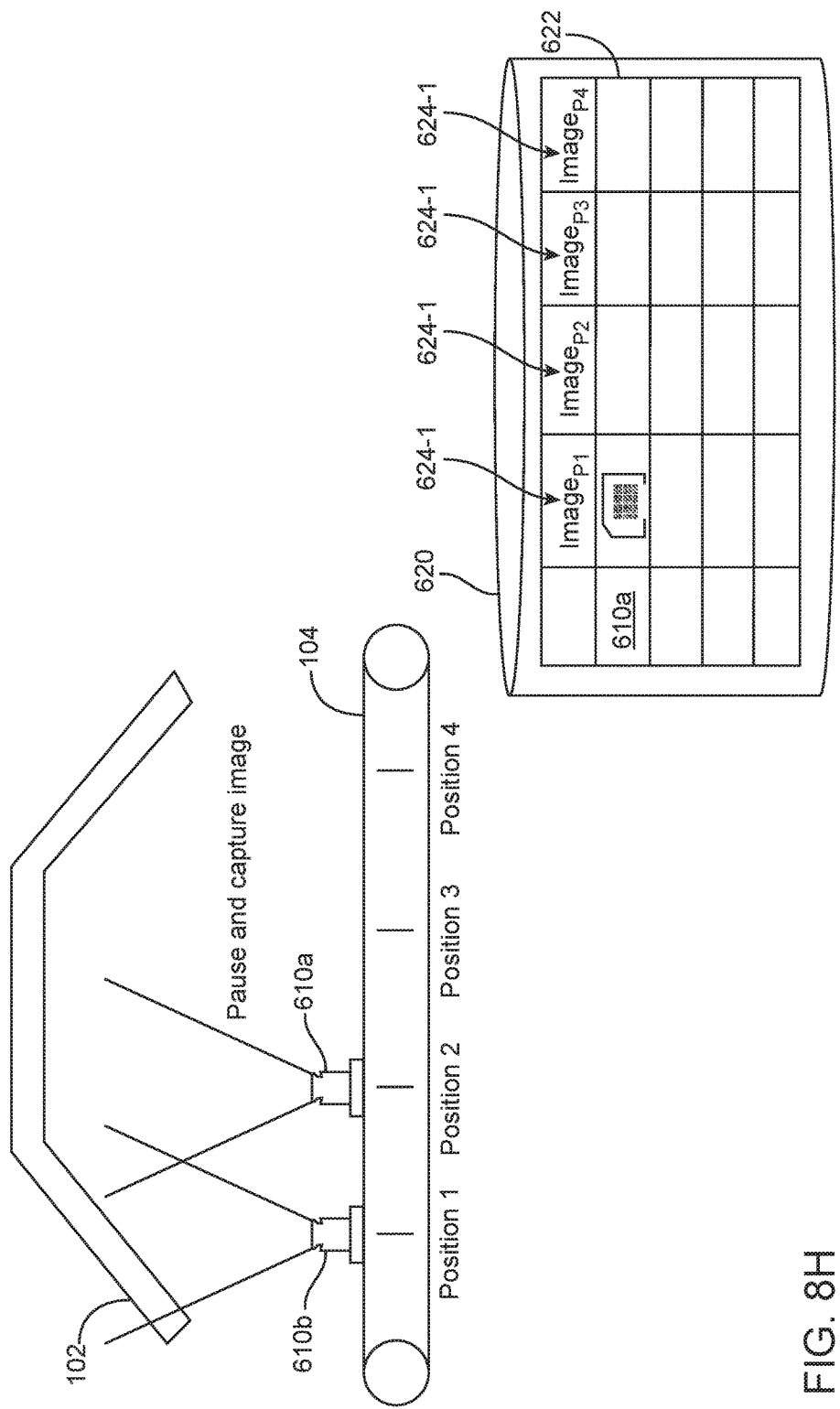
Figure 8I:
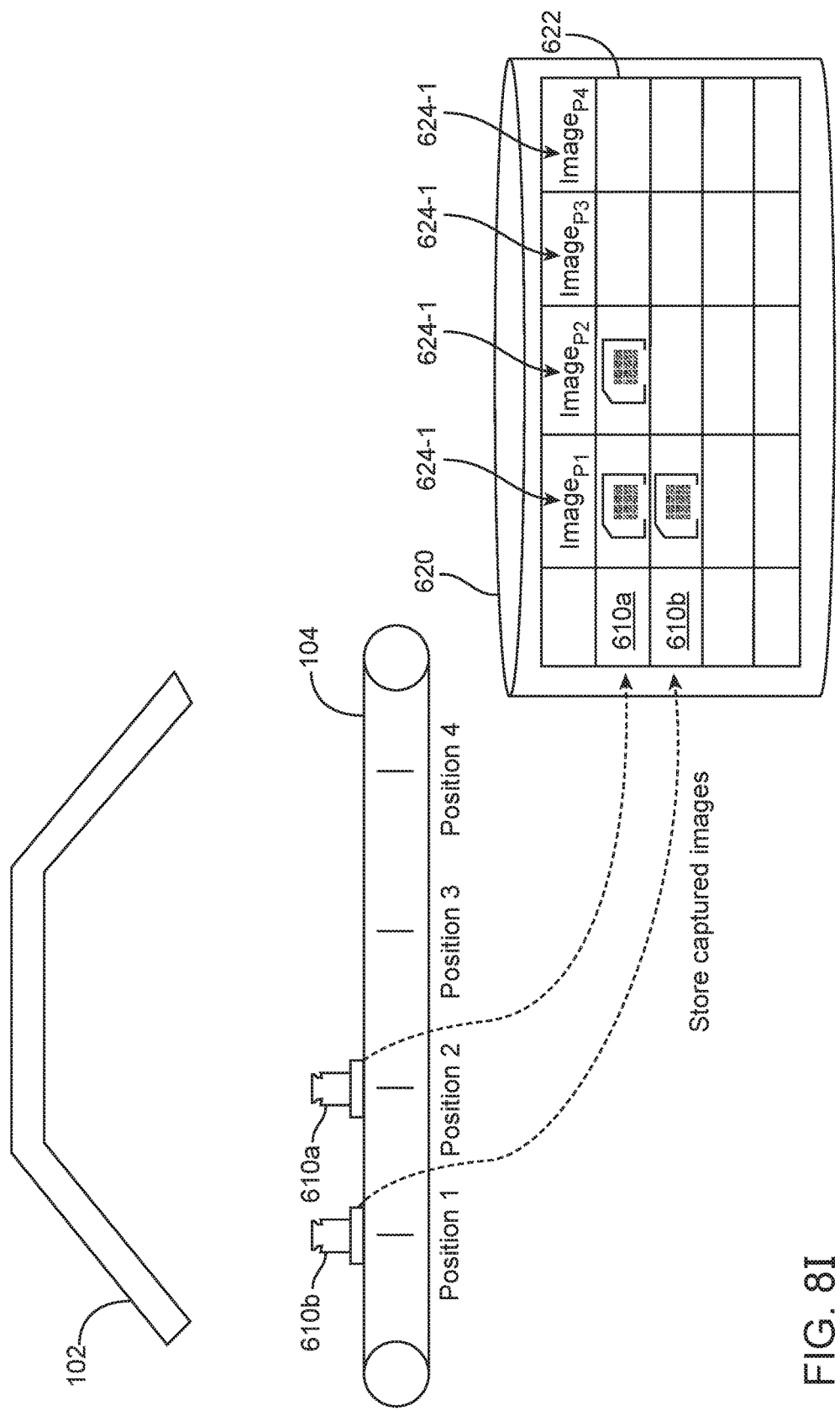
Figure 8K:
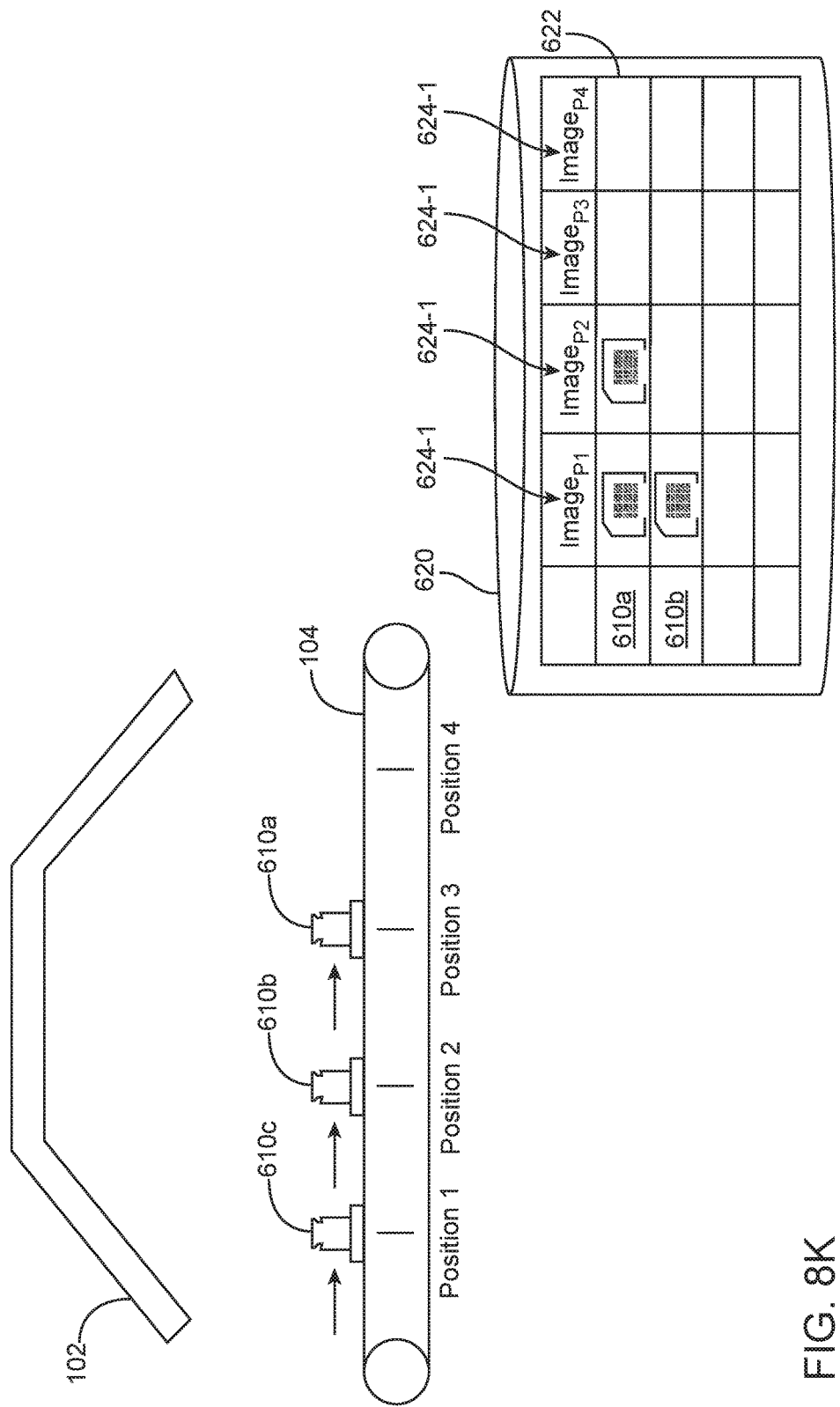
Figure 8L:
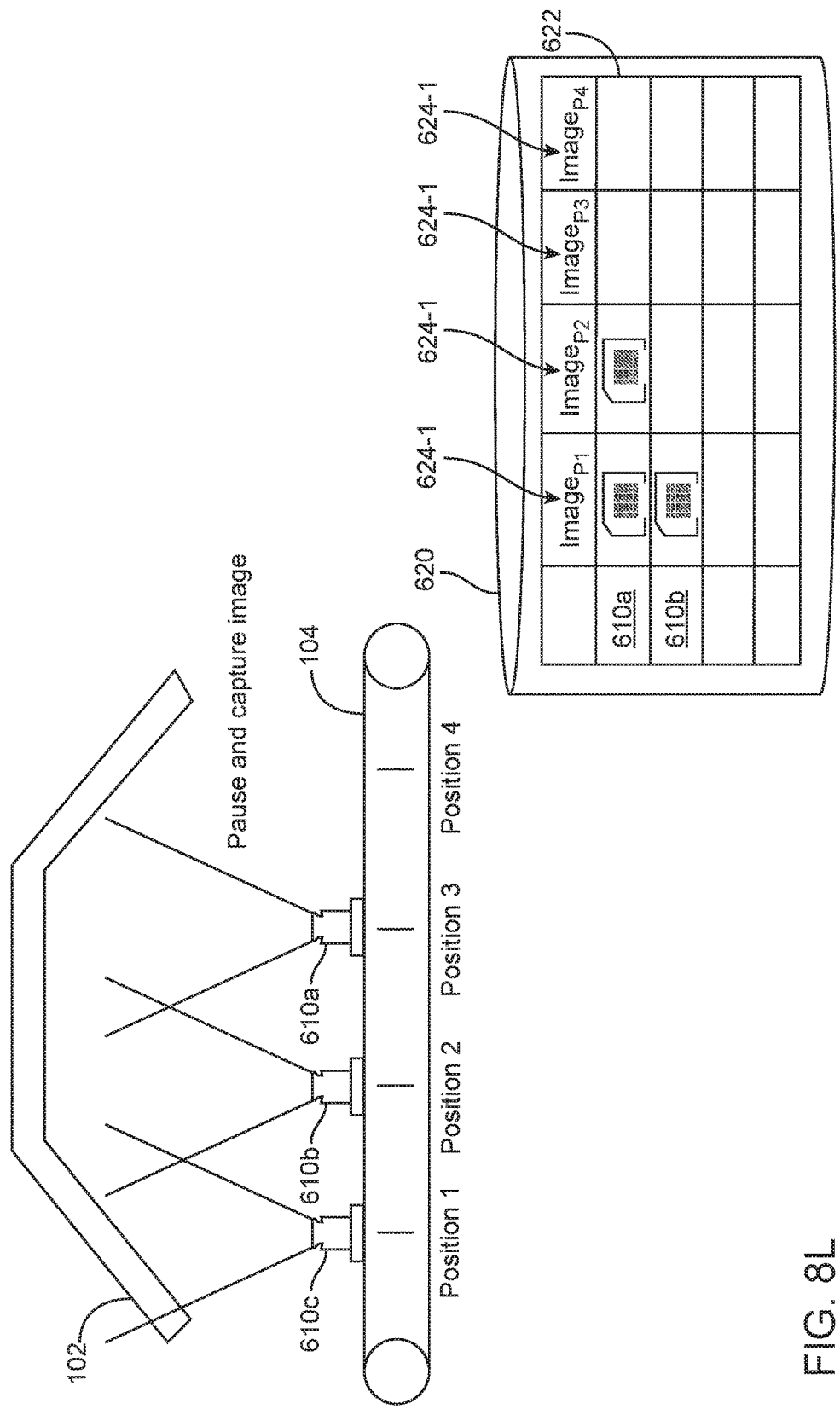
Figure 8M:
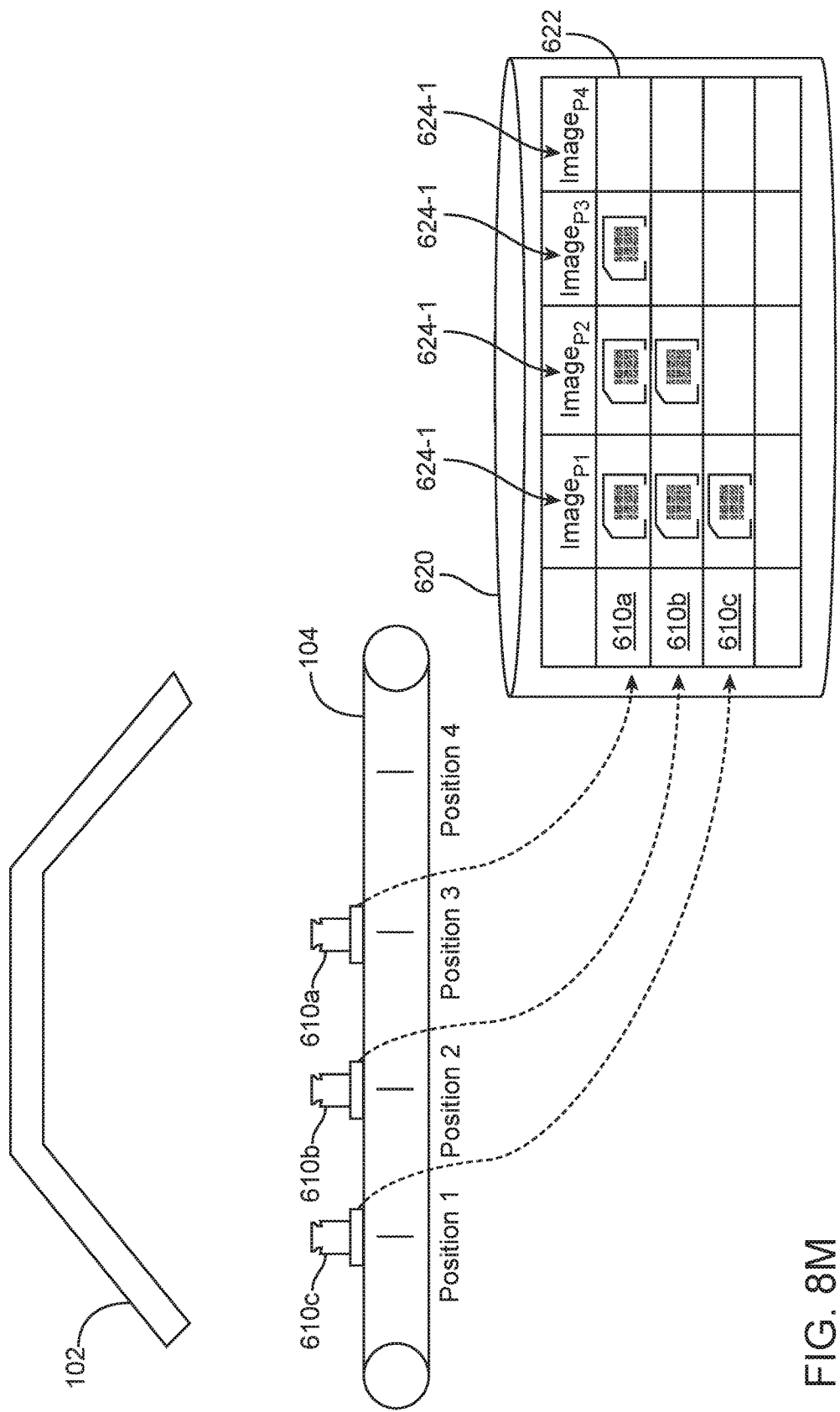
Figure 8N:
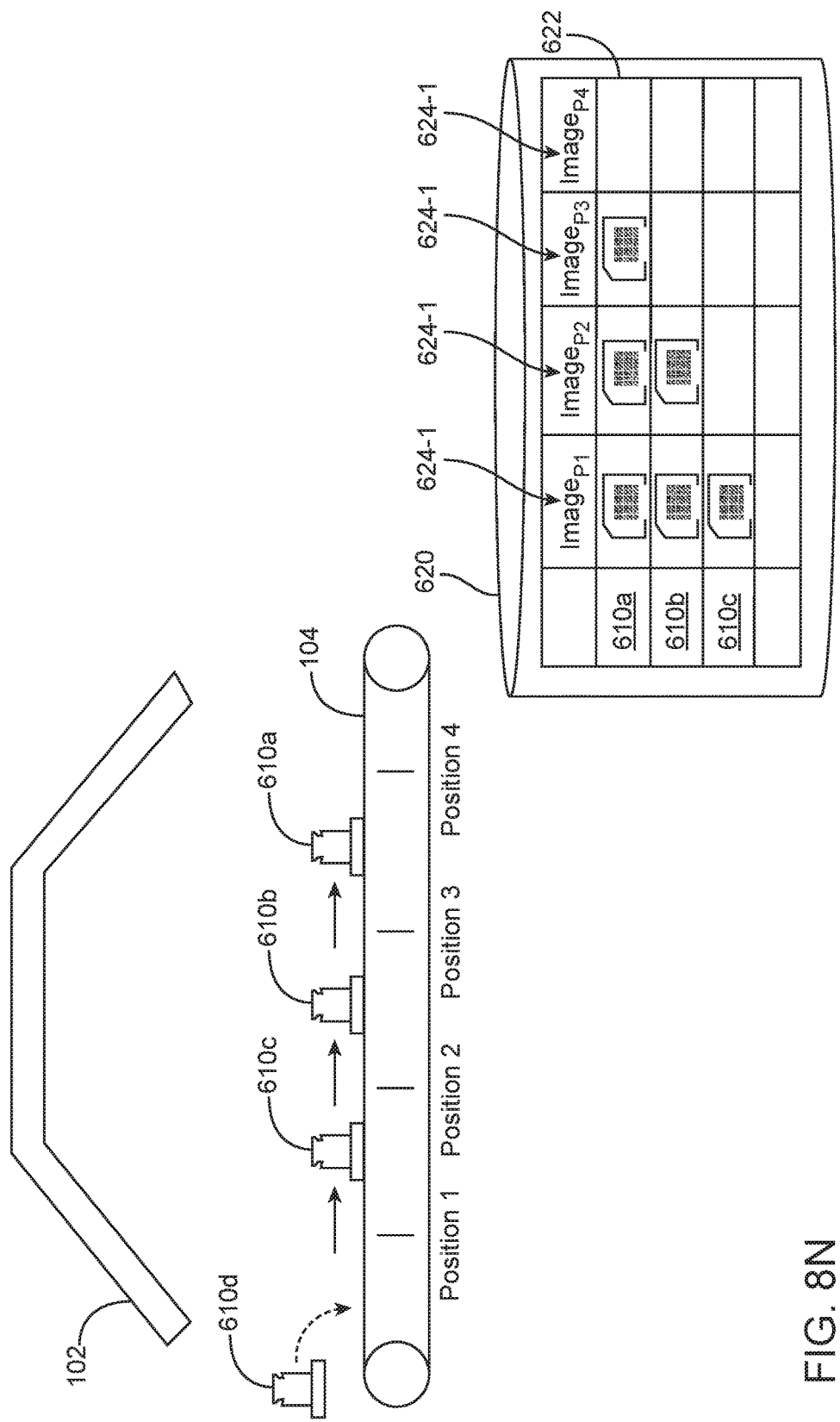
Figure 8O:
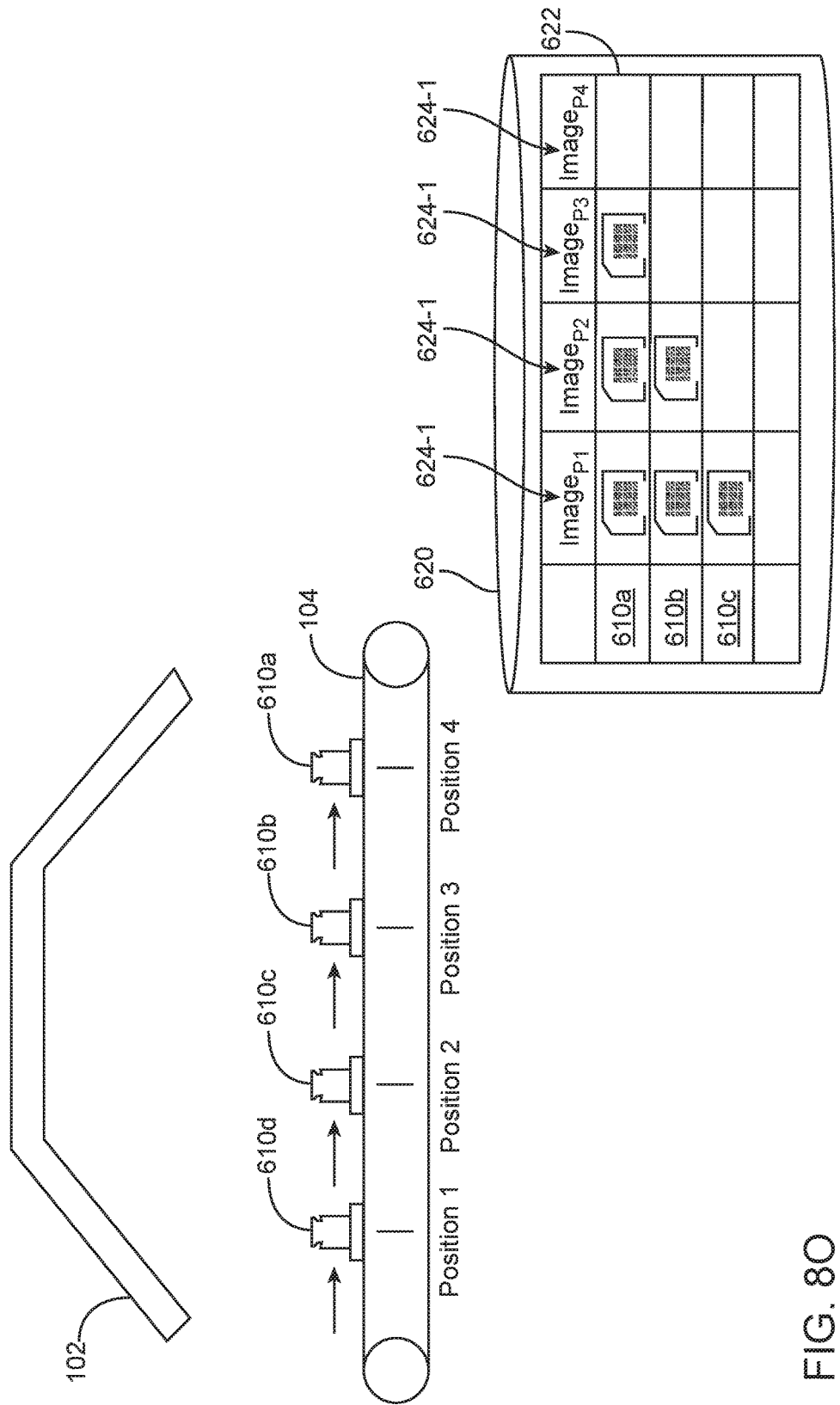
Figure 8P:
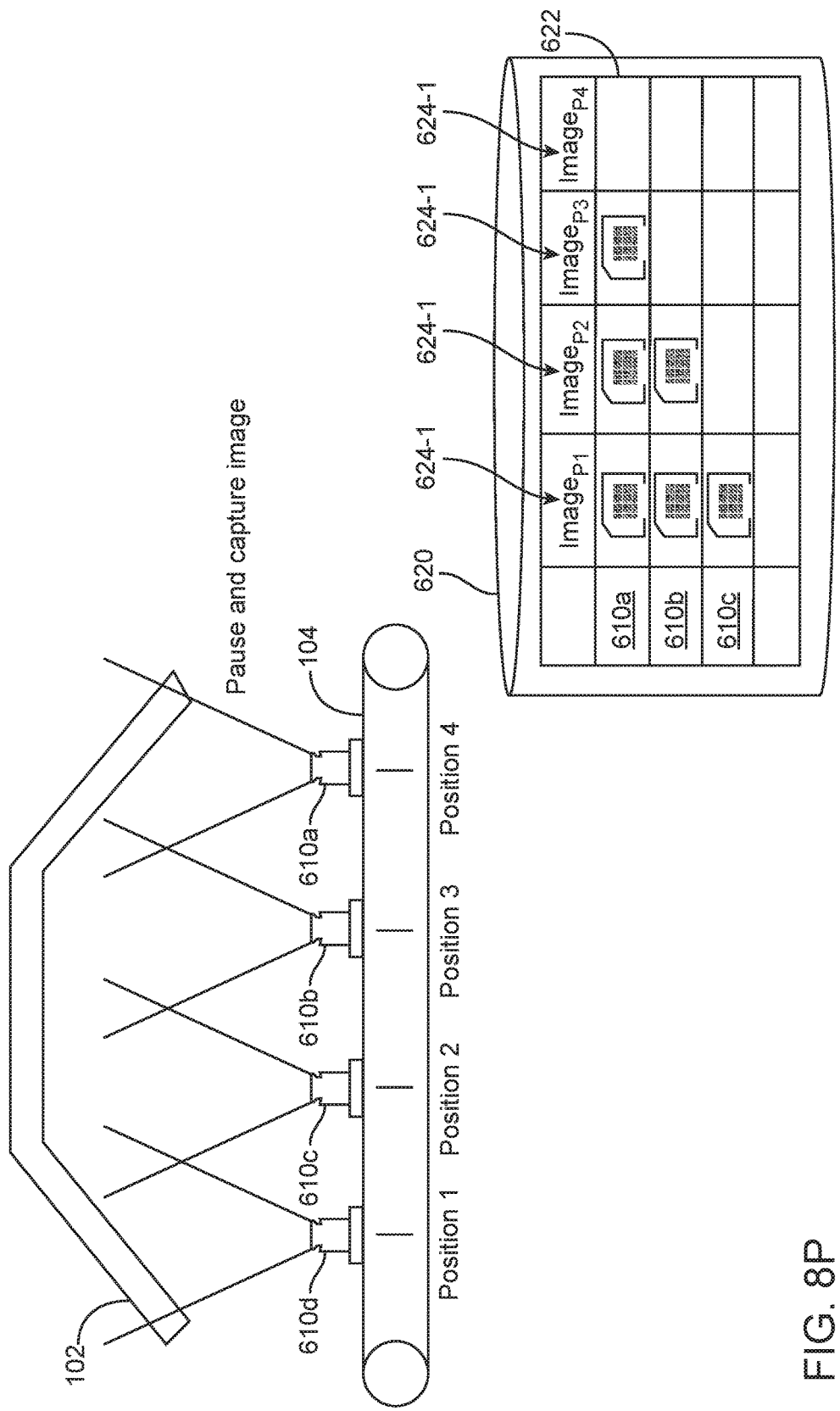
Figure 8Q:
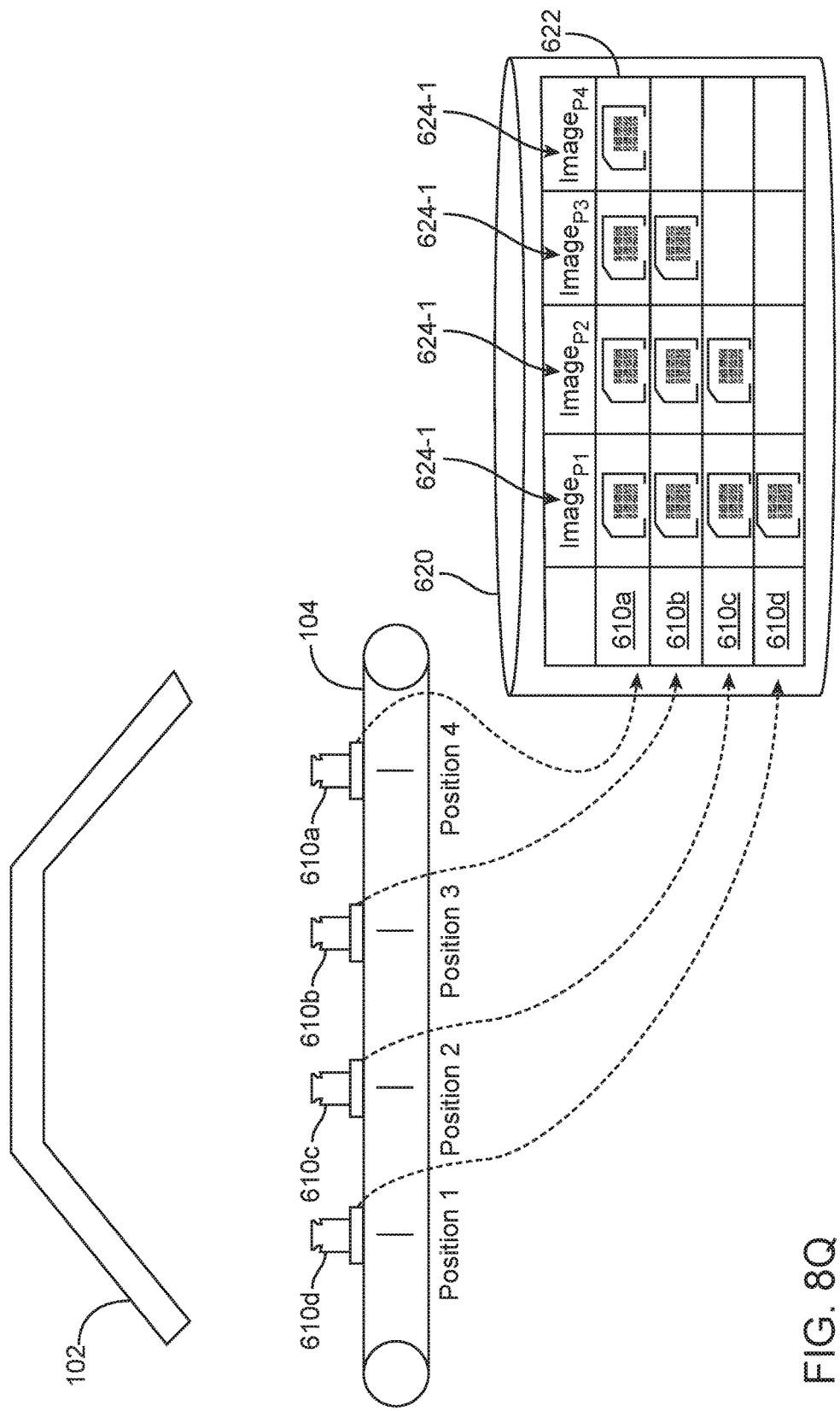
Figure 8R:
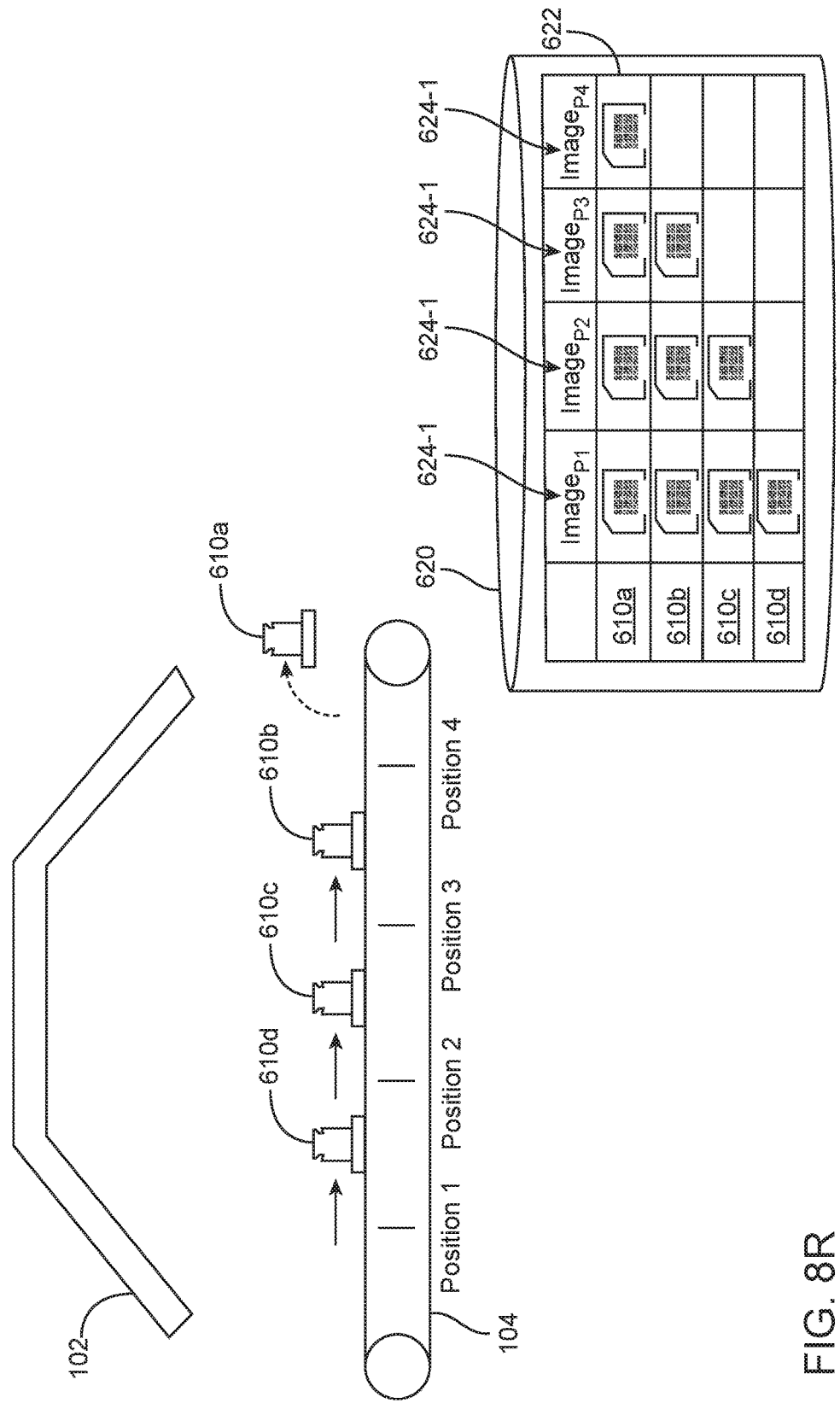
Figure 8S:
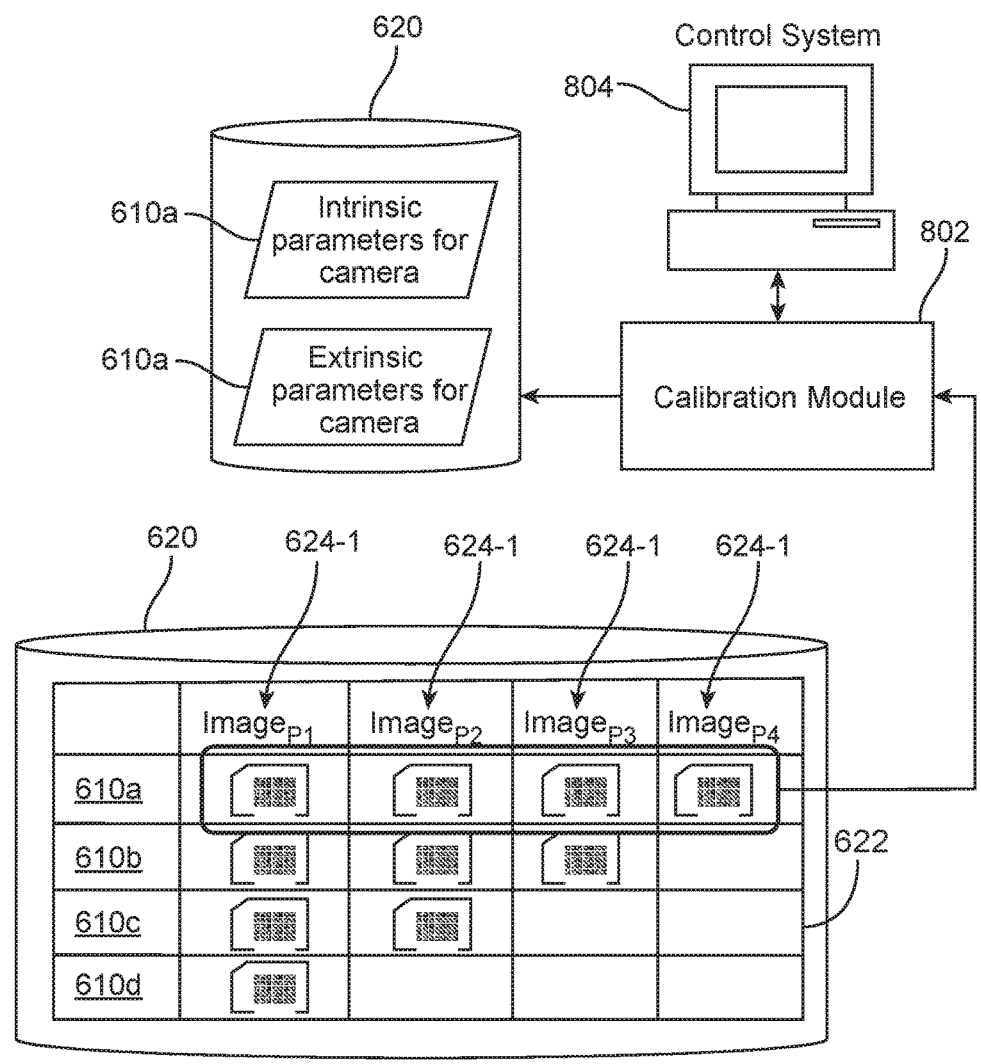

FIGS. 8A through 8S provide an illustrative example for this calibration process according to some embodiments of the invention. FIG. 8A shows an example system to perform camera calibration that includes a conveyer belt 104 having multiple placement positions for multiple cameras. Here, the conveyer belt 104 is configured to have four positions 1, 2, 3, and 4 to concurrently support four cameras for calibration. As previously noted, the target 102 comprises a generally partial-spherical shape having multiple planar targets portions where some or all of the planar target portions include an Aruco and/or Charuco target.

A database 622 is configured to hold the image data to be captured by cameras undergoing calibration in the calibration system. The database 622 comprises a data structure that includes data portions to individually store image data content for images to be captured at each appropriate position on the conveyer belt 104. Here, the database 622 includes a portion 624-1 to hold image data for position 1, a portion 624-2 to hold image data for position 2, a portion 624-3 to hold image data for position 3, and a portion 624-4 to hold image data for position 4.

As shown in FIG. 8B, a camera 610a to be calibrated is loaded onto the conveyer belt 104 (e.g., from an input stack). For the sake of illustration, it is assumed that at this moment in time, there were no other cameras that had been previously loaded onto the conveyer belt 104. However, it is noted that if calibration for other cameras were already in progress, then at the time frame shown in FIG. 8B, other cameras would also be shown on the conveyer belt 104.

FIG. 8C illustrates the movement of the conveyer belt 104 shifting the camera 610a into position 1. At this point, as shown in FIG. 8D, the conveyer belt 104 pauses to allow the camera 610a to capture an image of the target 102. The image captured by the cameras 610a includes some or all of the markers within the Aruco/Charuco targets within the target 102.

As shown in FIG. 8E, the captured image is stored in database 622. In particular, an entry is created in database 622 for camera 610a, and location 624-1 within that entry for camera 610a is employed to store the captured image data for position 1.

At this point, as shown in FIG. 8F, the conveyer belt 104 begins moving again to shift camera 610a into a new position. The next camera 610b to be calibrated is also loaded onto the conveyer belt 104. Each of the cameras 610a and 610b that are concurrently placed onto the conveyer belt are located at designated positions that are spaced apart from one another at a pre-determined distance.

FIG. 8G illustrates the movement of the conveyer belt 104 to shift the cameras 610a and 610b into positions 1 and 2, respectively. At this point, as shown in FIG. 8H, the conveyer belt 104 pauses to allow the cameras 610a and 610b to capture images of the target 102 from their respective positions.

As shown in FIG. 8I, the captured images are then stored into database 622. For the image captured by camera 610a, the new image is stored into the same entry that had already been created for this camera within database 622, but the new image is placed into location 624-2 within that entry to store the captured image data for position 2. For camera 610b, a new entry is created within database 622 for this camera, and the captured image is stored within location 624-1 for that new entry.

As shown in FIG. 8J, the conveyer belt 104 begins moving again to shift cameras 610a and 610b into new positions. The next camera 610c to be calibrated is loaded onto the conveyer belt 104 at this point. As before, each of the cameras 610a, 610b, and 610c that are concurrently placed onto the conveyer belt are located at designated positions that are spaced apart from one another at pre-determined distances.

FIG. 8K shows the movement of the conveyer belt 104 to correspondingly move the cameras 610a, 610b, and 610c into positions 1, 2 and 3, respectively. At this point, as shown in FIG. 8L, the conveyer belt 104 pauses to allow the cameras 610a, 610b, and 610c to capture images of the target 102 from their respective positions.

As illustrated in FIG. 8M, the captured images for the cameras 610a, 610b, and 610c are then stored into database 622. For the image captured by camera 610a, the new image is stored into the same entry that had already been created for this camera within database 622, but the new image is placed into location 624-3 within that entry to store the captured image data for position 3. Similarly, for the new image captured by camera 610b, the image data is stored into the same entry that had already been created for this camera 610b within database 622, but the new image is placed into location 624-2 within that entry to store the captured image data for position 2. For camera 610c, a new entry is created within database 622 for this camera, and the captured image is stored within location 624-1 for that new entry for camera 610c.

FIG. 8N shows the movement of conveyer belt 104 to shift cameras 610a, 610b, and 610c into their new positions. The next camera 610d to be calibrated is also loaded onto the conveyer belt 104. As previously stated, each of the cameras 610a, 610b, 610c, and 610d that are concurrently placed onto the conveyer belt are located at designated positions spaced apart from each another at pre-determined distances.

FIG. 8O shows the movement of the conveyer belt 104 to move the cameras 610a, 610b, 610c, and 610d into positions 1, 2, 3 and 4, respectively. At this point, as shown in FIG. 8P, the conveyer belt 104 pauses to allow the cameras 610a, 610b, 610c, and 610d to capture images of the target 102 from their respective positions.

As illustrated in FIG. 8Q, the captured images for the cameras 610a, 610b, 610c, and 610d are then stored into database 622. For the image captured by camera 610a, the new image is stored into the same entry as before for this camera, but the new image is placed into location 624-4 within that entry to store the captured image data for position 4. For the new image captured by camera 610b, the image data is stored into the same entry that had already been created for this camera 610b within database 622, but the new image is placed into location 624-3 within that entry to store the captured image data for position 3. For the new image captured by camera 610c, the image data is stored into the same entry that had already been created for this camera 610c within database 622, but the new image is placed into location 624-2 within that entry to store the captured image data for position 2. For camera 610d, a new entry is created within database 622, and the captured image is stored within location 624-1 for that new entry for camera 610d.

The conveyer belt now begins moving again to shift the positions of the cameras that are undergoing calibration. At this point, camera 610a has captured an image from each of the positions 1-4. Therefore, as shown in FIG. 8R, camera 610a can now be unloaded from the conveyer belt 104.

This approach therefore operated to automatically move each camera to its successively required position to capture an image of the target 102. After an image has been captured by each camera, the conveyer moves again such that the cameras shift to their next succeeding positions to capture another image of the target 102. In this manner, each camera will successively capture an image of the target 102 from each of the positions 1, 2, 3, and 4. Once the camera has completed taking an image from each position 1-4, the next shifting of its position will cause that camera to be placed into the output stack 114.

As shown in FIG. 8S, the image data for camera 610a can be processed by calibration module 802 to process the image data. The different visual patterns (including, e.g., corner points of the checkerboard and marker images) captured from the variety of angled planes are identifiable from the captured images, which are used to generate calibration results such as the intrinsic parameters and the extrinsic parameters.

One or more users may interface with and operate the calibration system and/or calibration module 802 using a control system 804. Control system 804 and calibration module 802 comprises any type of computing station that may be used to operate, interface with, or implement one or more hardware system, software applications, or a combination of hardware and software. Examples of such computing systems include for example, servers, workstations, personal computers, or remote computing terminals connected to a networked or cloud-based computing platform. The computing system may comprise one or more input devices for the user to provide operational control over the activities of the system, such as a mouse or keyboard to manipulate a pointing object. The computing system may also be associated with a display device, such as a display monitor, for displaying analysis results or a control interface.

The image data and/or analysis results may be stored in a computer readable storage medium 620. The computer readable storage medium 620 includes any combination of hardware and/or software that allows for ready access to the data that is located at the computer readable storage medium 620. For example, computer readable storage medium 620 could be implemented as computer memory and/or hard drive storage operatively managed by an operating system, and/or remote storage in a networked storage device, such as networked attached storage (NAS), storage area network (SAN), or cloud storage. The computer readable storage medium 620 could also be implemented as an electronic database system having storage on persistent and/or non-persistent storage.

Figure 9:
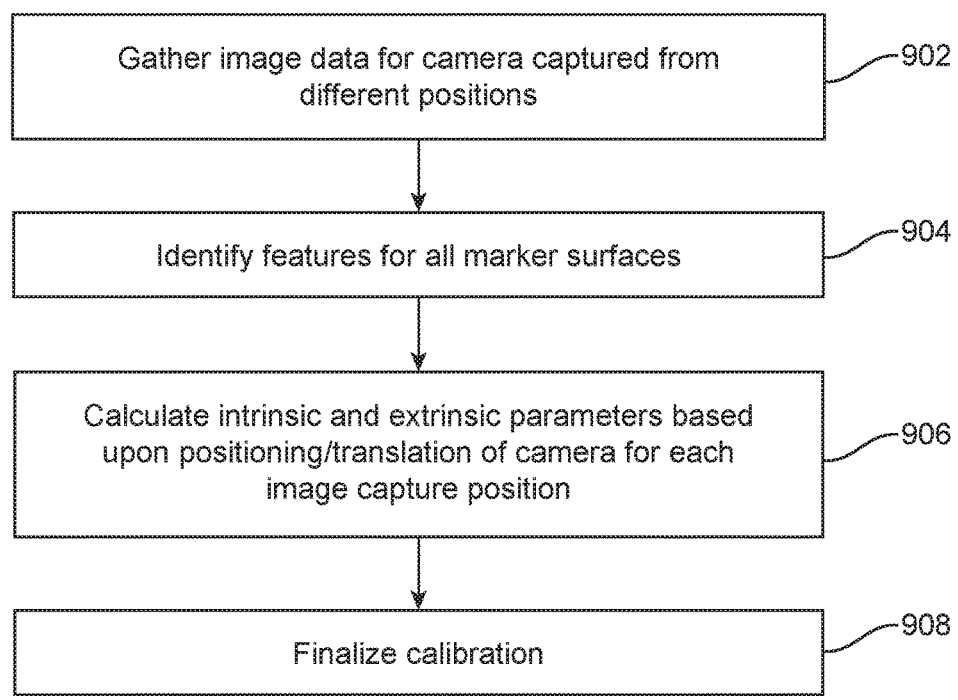
FIG. 9 shows a flowchart of an approach to process image data captured by a camera to perform calibration.

FIG. 9 shows a flowchart of an approach to process the image data captured by a camera to perform calibration for that camera. Fundamentally, a pinhole camera model can be used to calibrate a typical camera, where the goal of the calibration process is to identify the fundamental parameters associated with that camera. In particular, the camera calibration process in the present invention determines parameters of transformations between 3D space/coordinates and the various 2D images captured by the camera at the different positions.

Therefore, at 902, the image data is collected for the images captured by the camera at the different positions on the conveyer belt. As previously noted, these images were captured at known, pre-determined locations on the conveyer belt at known distances and offsets from the target 102. While the illustrative system shows images captured from four positions, it is noted that depending upon the specific configuration of the calibration system and its components, any number of images may be suitably captured by a camera and used for calibration.

Filtering and/or processing of the image data may occur at this point. For example, unwanted content from around the individual markers within the Aruco/Charuco targets (e.g., border content) may have been captured by the camera. Such content is unnecessary for calibration purposes and may therefore be discarded/filtered from the data set. In addition, any corrupt/erroneous content may also be filtered at this stage.

At 904, markers are identified from the image data. Each marker within an Aruco/Charuco target is an individualized marker having its own individualized coding. For example, a hamming code can be used to generate a unique signature for each marker within the targets. The specific pattern within a given marker is analyzed to see the exact position of each element within the marker, and the pattern is "decoded" to identify the specific marker at a specific location on a specific planar target surface of the semi-spherical target 102.

At 906, the intrinsic and extrinsic parameters for the camera are derived from the processed marker data. This is accomplished because the pre-defined knowledge of the location of the target means that the system can establish correspondence of the identified marker points in 3D space. In the current invention, the fact that there are multiple target planes, and the locations of all of these planes are known in relation to each other, provides numerous additional calibration points within the coordinate space. This therefore greatly facilitates precise and accurate estimation of the camera parameters. For example, when estimating the camera projection matrix, a linear solution can be acquired by performing linear estimations for each of the 2D-3D correspondences. It is noted that non-linear calculations may be used instead of, or in addition to, the linear estimations. For example, non-linear techniques may be employed to optimize the linear solutions.

Once the camera projection matrix is known, intrinsic parameters can be derived, such as for example: (a) the focal length of the camera in both the X and Y axes; (b) optical center of the camera (or camera sensor); and/or (c) distortion coefficients.

Extrinsic parameters may also be derived for the camera. Reference data external to the camera would be obtained and used to determine the extrinsic parameters. The extrinsic parameters can be obtained as 3D rotations and 3D translations to translate the camera reference system to another reference system, e.g., relative to another camera in a two-camera stereoscopic system.

At 908, calibration is finalized by storing the calibration parameters within an appropriate storage location on a computer readable medium.

Therefore, what has been described is an improved method, system, and apparatus to perform camera calibration, where cameras are mounted onto a moving conveyance apparatus to capture images of a multi-planar calibration target. The multi-planar calibration target is a backlighted target in some embodiments. The calibration process is optimized by reducing the number of images captured while simultaneously preserving overall information density. Embodiments of the present invention therefore solves the problems of the conventional approach that are too time consuming, computationally expensive, and just plainly ill-suited for high-volume manufacturing.

System Architecture Overview

Figure 10:
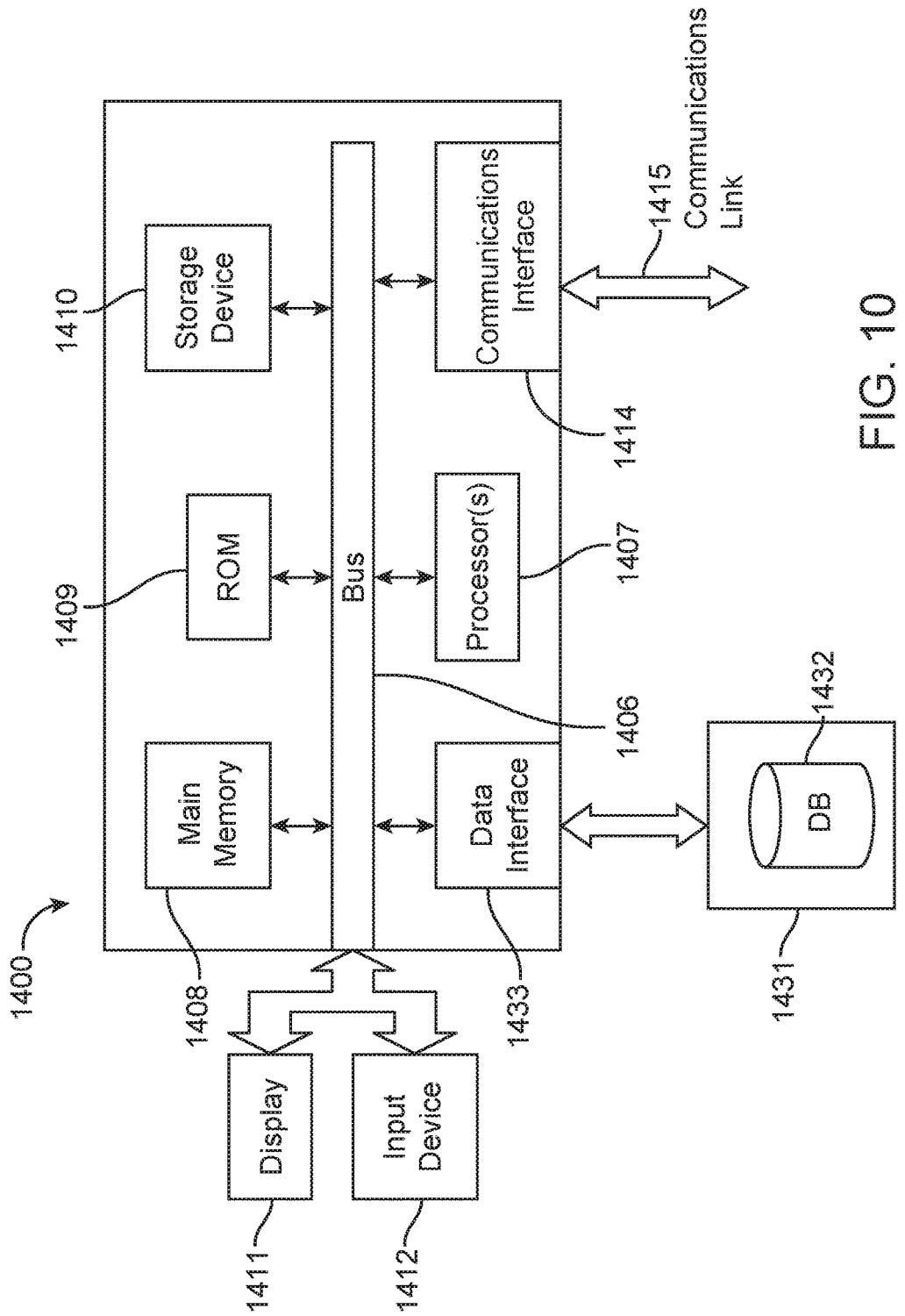
FIG. 10 depicts a computerized system on which some embodiments of the invention can be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system, comprising:
   a movable platform having a mounting surface to hold a plurality of cameras;
   a tessellated concave target having a plurality of planar target regions,
      wherein a principle axis of the tessellated concave target is oriented towards the movable platform,
      wherein the movable platform is spaced apart from the tessellated concave target; and
   an input stack mechanism to load a camera onto the movable platform and an output stack mechanism to offload the camera off the movable platform.

2. The system of claim 1, wherein the movable platform is a conveyer belt.

3. The system of claim 1, wherein the movable platform is spaced apart from the tessellated concave target at a distance corresponding to a focal distance of the plurality of cameras.

4. The system of claim 1, wherein each camera from the plurality of cameras is located at a position on the movable platform, the position being spaced apart from one another camera at a set distance, wherein the each camera image capture direction is facing the tessellated concave target.

5. The system of claim 1, further comprising a data structure for storing camera calibration images, wherein a row within the data structure corresponds to a camera from the plurality of cameras located at the position on the movable platform and columns corresponds to images of the tessellated concave target captured by the camera at designated positions relative to the tessellated concave target along the movable platform.

6. A method for performing camera calibration, comprising:
   loading a plurality of cameras onto a movable platform, wherein the plurality of cameras have camera image capture directions oriented towards a tessellated concave target having a plurality of planar target regions;
   operating the movable platform to shift the plurality of cameras into designated positions relative to the target;
   pausing movement of the movable platform to capture an image from each of the plurality of cameras when the plurality of cameras are located at the designated positions relative to the target; and
   calibrating the plurality of cameras using visual patterns observed from a collection of images captured by each camera at each of the designated positions.

7. The method of claim 6, wherein some or all of the planar target regions comprises a plurality of individualized markers, and the visual patterns include images of the individualized markers and corner points of a checkerboard pattern.

8. The method of claim 6, wherein the images undergo filtering.

9. The method of claim 6, wherein calibrating of the plurality of cameras comprises identification of individualized markers from the image, wherein the individualized markers correspond to Aruco or Charuco targets.

10. The method of claim 6, wherein calibrating of the plurality of cameras comprises deriving intrinsic and extrinsic parameters for the plurality of cameras.

11. The method of claim 6, wherein each camera from the plurality of cameras is located at a position on the movable platform, the position being spaced apart from one another camera at a set distance, wherein the each camera image capture direction is facing the tessellated concave target.

12. The method of claim 6, further comprising storing camera calibration images in a data structure, wherein a row within the data structure corresponds to a camera from the plurality of cameras located at a position on the movable platform and columns corresponds to images of the tessellated concave target captured by the camera at the designated positions relative to the tessellated concave target along the movable platform.

13. A computer readable medium having stored thereon a sequence of instructions which, when executed by a processor causes the processor to execute a method for performing camera calibration, the method comprising:
loading a plurality of cameras onto a movable platform, wherein the plurality of cameras have camera image capture directions oriented towards a tessellated concave target having a plurality of planar target regions;
operating the movable platform to shift the plurality of cameras into designated positions relative to the target;
pausing movement of the movable platform to capture an image from each of the plurality of cameras when the plurality of cameras are located at the designated positions relative to the target; and
calibrating the plurality of cameras using visual patterns observed from a collection of images captured by each camera at each of the designated positions.

14. The computer readable medium of claim 13, wherein some or all of the planar target regions comprises a plurality of individualized markers, and the visual patterns include images of the individualized markers and corner points of a checkerboard pattern.

15. The computer readable medium of claim 13, wherein the images undergo filtering.

16. The computer readable medium of claim 13, wherein calibrating of the plurality of cameras comprises identification of individualized markers from the image, wherein the individualized markers correspond to Aruco or Charuco targets.

17. The computer readable medium of claim 13, wherein calibrating of the plurality of cameras comprises deriving intrinsic and extrinsic parameters for the plurality of cameras.

18. The computer readable medium of claim 13, wherein each camera from the plurality of cameras is located at a position on the movable platform, the position being spaced apart from one another camera at a set distance, wherein the each camera image capture direction is facing the tessellated concave target.

19. The computer readable medium of claim 13, wherein the method further comprising storing camera calibration images in a data structure, wherein a row within the data structure corresponds to a camera from the plurality of cameras located at a position on the movable platform and columns corresponds to images of the tessellated concave target captured by the camera at the designated positions relative to the tessellated concave target along the movable platform.

* * * * *